(12) United States Patent
Wenneman et al.

(10) Patent No.: US 8,504,485 B1
(45) Date of Patent: Aug. 6, 2013

(54) ADAPTIVE REGIONALIZATION FOR TRANSIT CHARACTERISTIC PREDICTION

(75) Inventors: M. Christopher Wenneman, Seattle, WA (US); Benjamin Elliott Pew, Seattle, WA (US); Llewellyn W. Bezanson, North Bend, WA (US); Girish S. Lakshman, Samammish, WA (US); Saurabh D. Baji, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 668 days.

(21) Appl. No.: 12/717,791

(22) Filed: Mar. 4, 2010

(51) Int. Cl.
*G06Q 30/00* (2012.01)

(52) U.S. Cl.
USPC .......................................................... 705/338

(58) Field of Classification Search
USPC .......................................................... 705/338
See application file for complete search history.

(56) References Cited

U.S. PATENT DOCUMENTS

| | | | |
|---|---|---|---|
| 5,265,006 A | 11/1993 | Asthana et al. | |
| 6,282,489 B1 | 8/2001 | Bellesfield et al. | |
| 2001/0051876 A1 | 12/2001 | Seigel et al. | |
| 2002/0013734 A1 | 1/2002 | Bueno | |
| 2002/0082893 A1 | 6/2002 | Barts et al. | |
| 2002/0147631 A1 | 10/2002 | Smith et al. | |
| 2002/0165804 A1 | 11/2002 | Beebe et al. | |
| 2004/0243472 A1 | 12/2004 | Vadjinia | |
| 2004/0249742 A1 | 12/2004 | Laurent et al. | |
| 2007/0043766 A1* | 2/2007 | Nicholas et al. | 707/104.1 |
| 2010/0017273 A1* | 1/2010 | Hommrich et al. | 705/10 |

OTHER PUBLICATIONS

U.S. Appl. No. 11/094,505, titled "Method and System for Transit Characteristic Prediction" filed Mar. 30, 2005.
U.S. Appl. No. 11/506,721, titled "Selecting Shipping Methods Dependent on a Dynamic Model of Shipping Activity" filed Aug. 18, 2006.
U.S. Appl. No. 11/015,288, entitled "Method and system for anticipatory package shipping" and filed Dec. 17, 2004.
U.S. Appl. No. 11/015,290, entitled "Method and system for forecasted package shipping using late-select addressing" and filed Dec. 17, 2004.
Microsoft Windows 2000 Server TCP/IP Core Networking Guide, Jan. 19, 2000.

* cited by examiner

*Primary Examiner* — John Hayes
*Assistant Examiner* — Allen J Jung
(74) *Attorney, Agent, or Firm* — Robert C. Kowert; Meyertons, Hood, Kivlin, Kowert & Goetzel, P.C.

(57) ABSTRACT

A method and system for transit characteristic prediction. In one embodiment, a method may include determining respective transit latencies from a source location to a number of destination locations, and grouping the destination locations according to a fitness function into a number of subsets corresponding to respective geographical regions. The grouping may involve a series of divisions and combinations of potential regions to form a plurality of sets of potential regions. Each set of potential regions may be evaluated using the fitness function, and the set with the better fitness score may be selected. The method may also include dynamically updating the respective transit characteristic, regrouping the regions, and reselecting a set of potential regions based on empirical transit data.

37 Claims, 15 Drawing Sheets

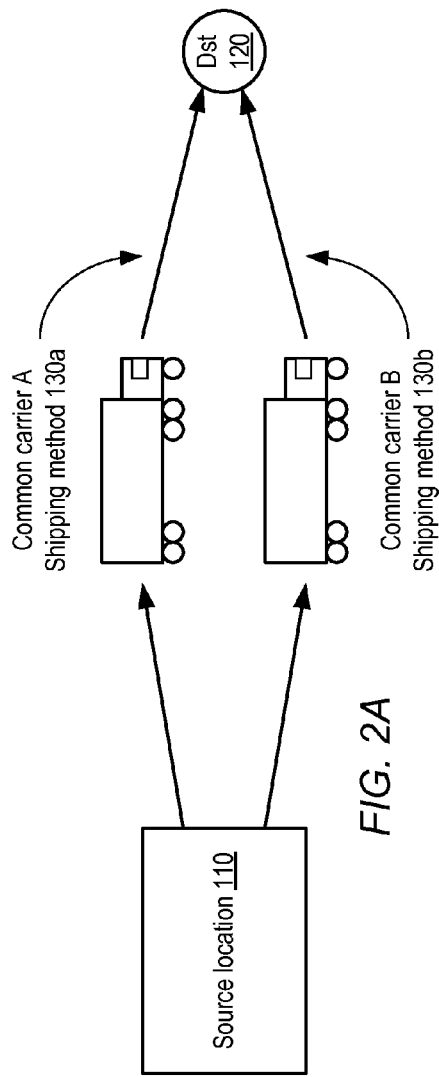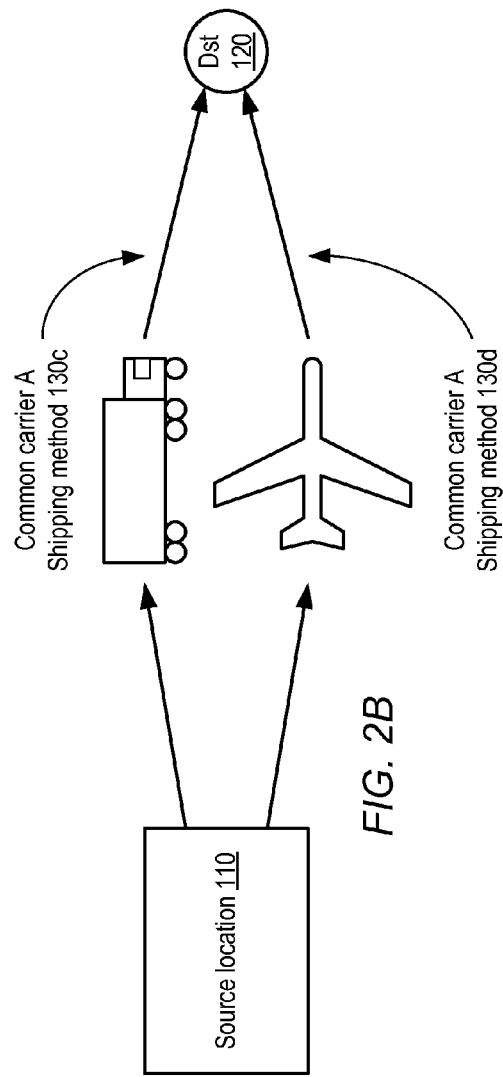

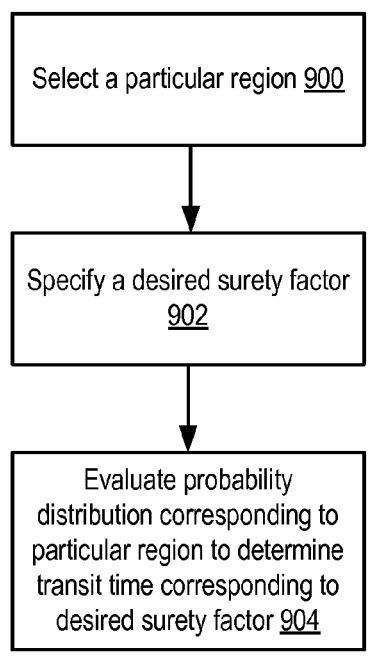
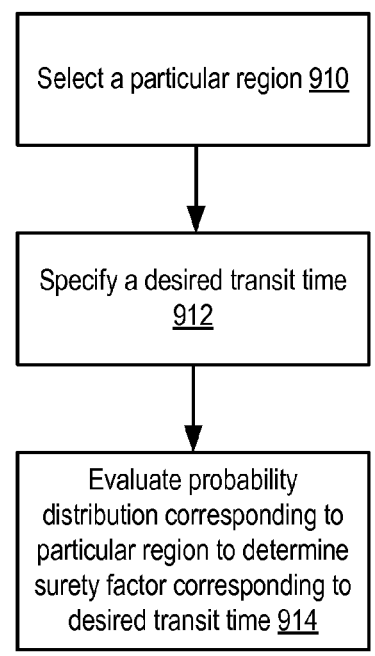
FIG. 10A
FIG. 10B

ADAPTIVE REGIONALIZATION FOR TRANSIT CHARACTERISTIC PREDICTION

BACKGROUND

In the course of commerce, manufacturing and other business activities, different kinds of material often need to be conveyed from one location to another. For example, a global, web-based or brick-and-mortar retail sales operation may routinely ship packages containing customer orders around the world. Similarly, a distributed manufacturing operation may ship components or partially-assembled items from one manufacturing site to another for continued processing. Materials conveyance may also occur on a smaller scale, such as from a materials receiving area of a large, complex manufacturing site to one of a number of processing areas within the site.

Reliably predicting a transit characteristic, such as the time required to convey materials from one location to another (also referred to as transit time or transit latency), may be a critical parameter in an enterprise's operations. For example, in a manufacturing operation, overestimating transit time may result in having to hold materials in inventory until they are expected to be used, which may incur various logistical, facilities and overhead costs. By contrast, underestimating transit time may result in manufacturing downtime if reserves of materials are not available, which may result in lost productivity, missed production deadlines, etc. Similarly, a retail operation may find itself unable to meet customer demand or may suffer other problems with its supply chain to the extent that its supply-chain transit latencies remain unpredictable.

However, as the number of possible sources and destinations for materials increases, the number of possible transit paths to be predicted and managed quickly becomes intractable. For example, given M source locations that can ship materials to N possible different destinations, the number of possible transit paths is on the order of MN, and may be even higher if multiple different carriers or transit modalities are considered. For a retailer that ships directly to customers' businesses or residences, the number of possible destinations may number in the tens or hundreds of millions, resulting in correspondingly many potential data points to be stored. Searching through such a large number of data points to predict transit time for a particular source and destination consequently may be prohibitively expensive. Further, for a given source and destination, no historical data points may exist from which to predict transit time, or the data may be insufficient in quality or quantity for a meaningful prediction.

BRIEF DESCRIPTION OF THE DRAWINGS

FIGS. 2A-B are block diagrams illustrating exemplary embodiments of shipping methods between source locations and destination locations.

FIG. 10A is a flow diagram illustrating one embodiment of a method of determining transit time of a shipping method given a desired surety factor.

FIG. 10B is a flow diagram illustrating one embodiment of a method of determining a surety factor of a shipping method given a desired transit time.

Figure 1:
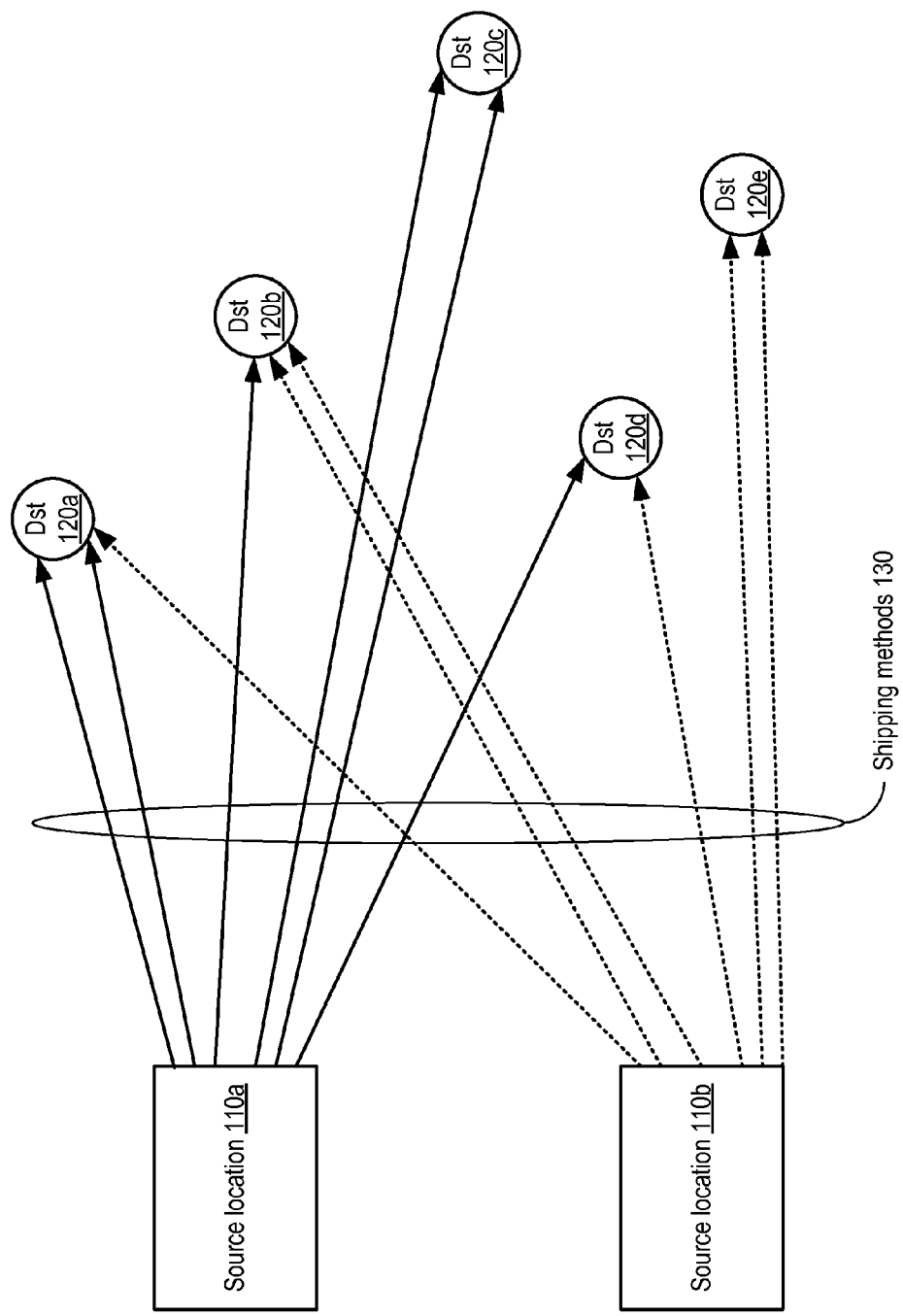
FIG. 1 is a block diagram illustrating one embodiment of source locations, destination locations and shipping methods between sources and destinations.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Incorporation by Reference

The following references are hereby incorporated by reference in their entirety as though fully and completely set forth herein:

U.S. patent application Ser. No. 11/094,505, titled "Method And System For Transit Characteristic Prediction" filed Mar. 30, 2005.

U.S. patent application Ser. No. 11/506,721, titled "Selecting Shipping Methods Dependent On A Dynamic Model Of Shipping Activity" filed Aug. 18, 2006.

Introduction

As mentioned above, modeling transit time or other transit characteristics between individual source and destination locations may quickly become intractable as the number of sources and destinations increases, e.g., to a global geographical scale. In the discussion below, a method for grouping destination locations into geographical regions using a fitness function is described. Rather than predicting and managing transit paths to individual destinations, such paths may be predicted on a region-by-region basis, which may dramatically reduce the complexity of the data required while preserving accuracy and flexibility in prediction. For example, in one embodiment the transit time from a source to a given region may be modeled as a probability distribution rather than a single, static value, which may enable a more sophisticated analysis of possible transit scenarios to the given region.

In the following discussion, a general overview of transit methods between sources and destinations is first provided. Subsequently, the dynamic modeling of destinations as regions is described, as well as the modeling of transit time distributions within particular regions. An exemplary embodiment of a system that may be configured to perform transit time modeling is also shown, and several applications of such modeling are described. However, it is noted that this organization is intended to facilitate exposition, and the embodiments described herein are not limited by section headings or the order in which the sections are presented.

Sources, Destinations and Transit Methods

In the embodiment of FIG. 1, a number of source locations 110a-b as well as a number of destination locations 120a-e are shown. Additionally, a number of shipping methods 130 between some of source locations 110 and destination locations 120 are shown. It is noted that in various embodiments, an arbitrary number of source locations 110, destination locations 120 and shipping methods 130 between them may be provided. For simplicity of reference, source locations 110 and destination locations 120 may also be referred to simply as sources 110 and destinations 120.

Generally speaking, a source location 110 may include any type of point of origin or departure for materials in transit, and similarly a destination location 120 may include any type of intermediate or final destination point. For example, in one embodiment, a source location 110 may include a warehouse or fulfillment center within which inventory may be stored and items may be selected and packaged for delivery to customers. A source location 110 may also include a third party shipper or drop shipper, e.g., a manufacturer, wholesaler or other party in possession of items, who may ship items upon receiving instructions to do so from a retailer or other party who is primarily responsible for managing the order. A destination location 120 may include, for example, a business or residential location identified by an address (e.g., a street address including a postal code). In other embodiments, source locations 110 and destination locations 120 may correspond to other types of facilities or locations, such as manufacturing plants, raw materials sources, product distributors or wholesalers, virtual or physical retailers, etc.

It is noted that neither source location 110 nor destination location 120 need represent the ultimate source or destination of an item in transit. For example, as described below in conjunction with the description of FIG. 2, in some embodiments multiple different modes or methods of transit may be used to convey materials from an originating source to a final destination. Thus, a destination location 120 with respect to one leg of transit, such as a common carrier's shipping hub, may serve as a source location 110 with respect to another leg of transit. Additionally, in some embodiments an entire supply chain for an item, from raw materials, manufacturing and distribution to final delivery to a customer may be modeled as a series of materials conveyance between source locations 110 and destination locations 120. For example, in the course of manufacturing an item or assembling an order including multiple different items, multiple different paths from different source locations 110 may correspond to the movement of raw materials or inventory throughout the supply chain. These paths may be modeled and tracked through the stage of assembly, packaging, delivery, etc., for example to coordinate just-in-time materials management, to meet manufacturing or shipping deadlines, or to meet other operational goals.

It is also noted that in some embodiments, the role of a source location 110 and a destination location 120 may be reversed with respect to a given item in transit. For example, in some instances defective items or excess quantities may be returned from a given destination location 120 to the source location 110 from which they were received, or possibly to another source location 110.

As a practical matter, it may be inconvenient or undesirable to provide for conveyance of items from every source location 110 to every destination location 120. For example, a fulfillment center on the West Coast of the United States may be better suited in general to service shipments destined for western states and Asia, whereas a fulfillment center on the East Coast may be preferable for servicing shipments to the eastern United States and Europe. Correspondingly, in the embodiment of FIG. 1, multiple different shipping methods 130 are illustrated between some pairs of source locations 110 and destination locations 120, while no paths are illustrated between other pairs of source and destination locations. However, in principle, it may generally be possible to convey an item from any given source location 110 to any given destination location 120 within some number of transit operations (e.g., via shipment to intermediate destinations 120, shipping hubs, etc.). Also, it is contemplated that in some embodiments, transshipment between two source locations 110 or two destination locations 120 may be performed. For example, inventory may be repositioned from one fulfillment center to another. For purposes of modeling and analysis, as noted above, a source location 110 may be modeled as a destination location 120 (or vice versa) under such circumstances.

FIGS. 2A-B illustrate several exemplary embodiments of particular shipping methods 130. As illustrated in FIG. 2A, in one embodiment two different shipping methods 130a-b between a source location 110 and a destination location 120 may correspond to the same mode or class of transit provided by two different common carriers, A and B. For example, shipping methods 130a-b may correspond to a surface-based mode of transit (e.g., ground service) provided by United Parcel Service (UPS) and FedEx, respectively. By contrast, as illustrated in FIG. 2B, in one embodiment shipping methods 130c-d may correspond to different modes of transit provided by the same common carrier A. For example, in this embodiment shipping methods 130c-d may correspond respectively to UPS Ground service and UPS Two-Day Air service.

Numerous possible combinations of carriers and classes or modes of transit may exist between a source 110 and a destination 120. For example, common carriers may include DHL, the United States Postal Service, and other shipping companies as well as the postal services of other countries. Additionally, privately contracted carriers (e.g., company-owned or leased fleets) may be employed to implement shipping methods 130 as an alternative or complement to the use of common carriers. In some embodiments, for example where sources 110 and destinations 120 are located within a single facility, shipping methods 130 may include various smaller-scale procedures and resources for moving materials, such as manned push carts, trucks, conveyor systems, etc. Generally speaking, a shipping method 130 may encompass any suitable method for conveying tangible goods from one location to another on a large or small geographic scale, including common or private carriers, land, air or sea modes, etc. In one embodiment, each shipping method 130 may be independently modeled to yield predictions regarding transit times from sources 110 to destinations 120 using a particular shipping method 130.

Geographical Regions for Transit Characteristics

Ideally, a predictive model of a shipping method 130 can be used to predict transit characteristics in a manner which is beneficial for the person or company performing the shipping. For example, the predictive model may present an accurate representation of the actual behavior of shipping method 130. Correspondingly, in one embodiment a predictive model of a shipping method 130 may be constructed through analysis of empirical transit data of actual shipments from sources 110 to destinations 120. For example, many common carriers collect and maintain copious amounts of tracking data documenting the progress of packages in transit within their systems. Further, common carriers typically make such tracking data available to shippers and customers via a variety of interfaces, such as web services interfaces accessible via a shipper's computer system. Tracking data may, for example, indicate the date and time at which a package was accepted by the carrier for shipment from a source 110 (or in some cases, a suitable proxy for a source such as, e.g., the nearest shipping hub) as well as the date and time of delivery at a destination 120. In other embodiments, such as intra-facility materials handling, empirical transit data may be collected by materials handling systems, such as bar code or RFID (radio frequency identifier) scanning devices operating in conjunction with a locator system (e.g., a global position system (GPS)), for example.

Over time, empirical tracking data may yield a substantial number of data points regarding shipments from a given source 110 to a variety of destinations 120 using a particular shipping method 130. Tracking data or other shipping or conveyance data may be representative of any of a number of different transit characteristics of conveyance of materials from a source 110 to a destination 120. Generally speaking, a transit characteristic may encompass any measurable or empirically observable aspect of materials transit between a given source 110 and a given destination 120. For example, in one embodiment, a transit characteristic may include a transit latency between given source 110 and given destination 120. In another embodiment, a transit characteristic may include a probability distribution of some metric associated with transit between given source 110 and given destination 120, such as a probability distribution of transit latency values. For example, as described in greater detail below, a number of different data points representing historical shipments to a given destination 120 may be grouped into a probability distribution of those data points with respect to given destination 120, and the probability distribution may be considered a transit characteristic corresponding to transit between given source 110 and given destination 120. In one particular embodiment, the transit characteristic may include transit variability, which may indicate the variability of transit times between a source and a destination via a given delivery method. In still another embodiment, a transit characteristic may include a shipping rate or cost between given source 110 and given destination 120, or a distribution of such rates (e.g., according to package size, weight, quality of service, etc.). Other types of transit characteristics are also possible and contemplated.

Forming Regions According to a Fitness Function

In one embodiment, destinations 120 having respective transit characteristics from source 110 for shipping method 130 may be grouped into geographical regions according to a fitness function. Depending on the fitness function used, the destinations 120 within these geographical regions may have similar values of transit characteristics, e.g., when the fitness function is used for the transit characteristic(s) in questions. For example, as described below, where the fitness function uses only a single transit characteristic as input, the fitness function may be used to form geographical regions which accurately represent that transit characteristic. However, other criteria may be used in the fitness function, including costs (or cost savings), distance, etc., resulting in geographical regions which match the provided criteria. For example, where the fitness function is used to increase or maximize cost savings, e.g., for shipping methods, selection of shipping methods using the resulting regions may have the corresponding result. In one embodiment, the fitness function may be modified as a pluggable interface, where any number of criteria may be specified and used, as desired. Note that, for simplicity of explanation, much of the following discussion refers to grouping of destinations 120 into regions on the basis of transit latencies. However, it is understood that the methods and techniques described below may generally apply to grouping of destinations 120 into regions on the basis of any suitable transit characteristic or other fitness function criteria, including probability distributions (of transit latencies or other data), transit rates or other relevant characteristics.

U.S. patent application Ser. No. 11/094,505 ("the '505 application), which was incorporated by reference in its entirety above, describes a different manner for forming geographical regions by grouping destinations whose transit characteristics satisfy similarity criteria. Note that the embodiments and details described in the '505 application, such as those related to probability distributions, may be applicable to the fitness function embodiments described herein.

Figure 3:
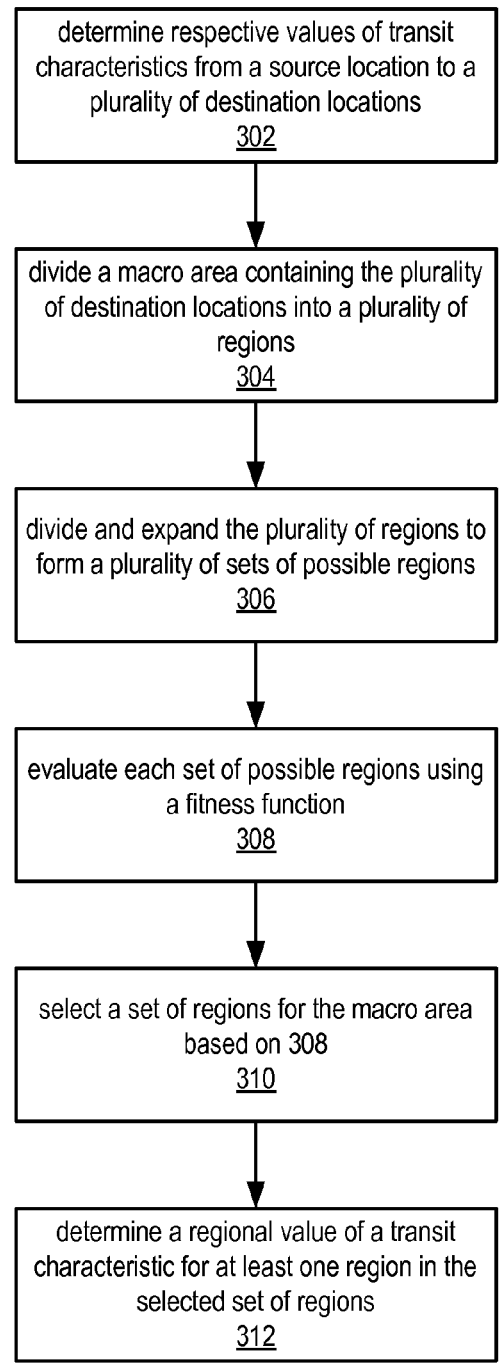
FIG. 3 is a flow diagram illustrating one embodiment of a method of grouping destinations into geographical regions according to a fitness function.
Figure 4:
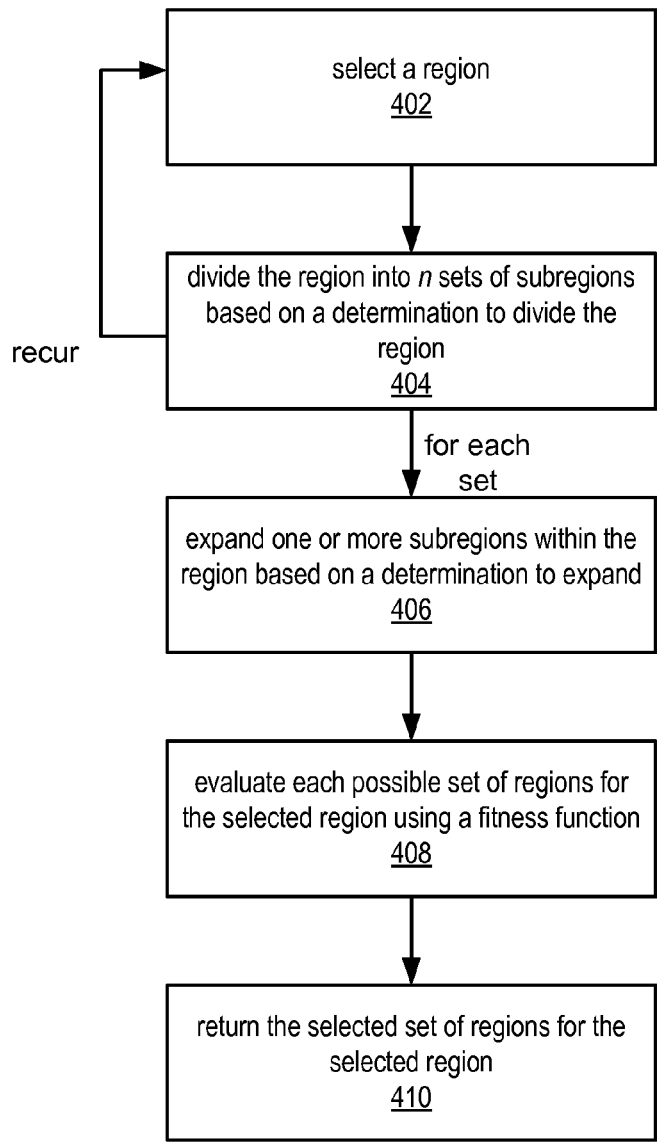
FIG. 4 is a flow diagram illustrating one embodiment of a method for recursively grouping destinations into geographical regions according to a fitness function.

FIG. 3 illustrates a method for forming regions based on a fitness function. Additionally, FIG. 4 illustrates a specific embodiment where steps 304-308 are performed in a recursive manner. The method shown in FIGS. 3 and 4 may be used in conjunction with any of the computer systems or devices shown in the Figures, among other devices. In various embodiments, some of the method elements shown may be performed concurrently, in a different order than shown, or may be omitted. Additional method elements may also be performed as desired. As shown, this method may operate as follows.

In 302, respective values of transit characteristics from a source location 110 to a plurality of destination locations 120 may be determined. Additionally, the respective values may be limited to a specific shipping method between the source location and the plurality of destination locations. As indicated above, the transit characteristics may include transit latency (e.g., shipping time), transit variability (e.g., the variability of latency, potentially represented as a histogram or probability distribution), shipping costs, etc.

The values of the transit characteristics may correspond to (or be derived from) empirical transit data, e.g., observations of actual shipments. For example, an observation may include the origin (source location 110) and destination, possibly specified according to postal codes, such as zip codes, or lat, long coordinates. Each observation may further include the origin shipping time (with various specificity, including, for example, date, time of day, day of the week, month of year, season, etc.); the arrival shipping time (e.g., with similar possibilities of specificity); and/or cost of delivery, among other possibilities. Such observations may be usable to determine transit variability for a specific destination (e.g., a specific destination zip code), e.g., by deriving the transit variability for all observations for the specific destination. The observations may also be usable to determine or derive further transit characteristics. In further embodiments, the transit characteristics may be presented in the form of probability distributions rather than individual observations. In this case, a function which approximates the actual values may be used instead of the values of the transit characteristics themselves. Various embodiments described in the '505 application regarding use of probability distributions may be applicable to the methods described herein.

The plurality of destinations 120 may form a macro region. More specifically, the macro region may be the containing region for every source location 110 and destination location. For example, in one embodiment, a macro region may be defined as a rectangle which contains all of the locations. Where lat, long coordinates are used, the rectangle may be {min lat, min long, max lat, max long}. However, the macro region may be defined as a polygon (e.g., with n greater than 4) rather than simply a rectangle.

Figure 5A:
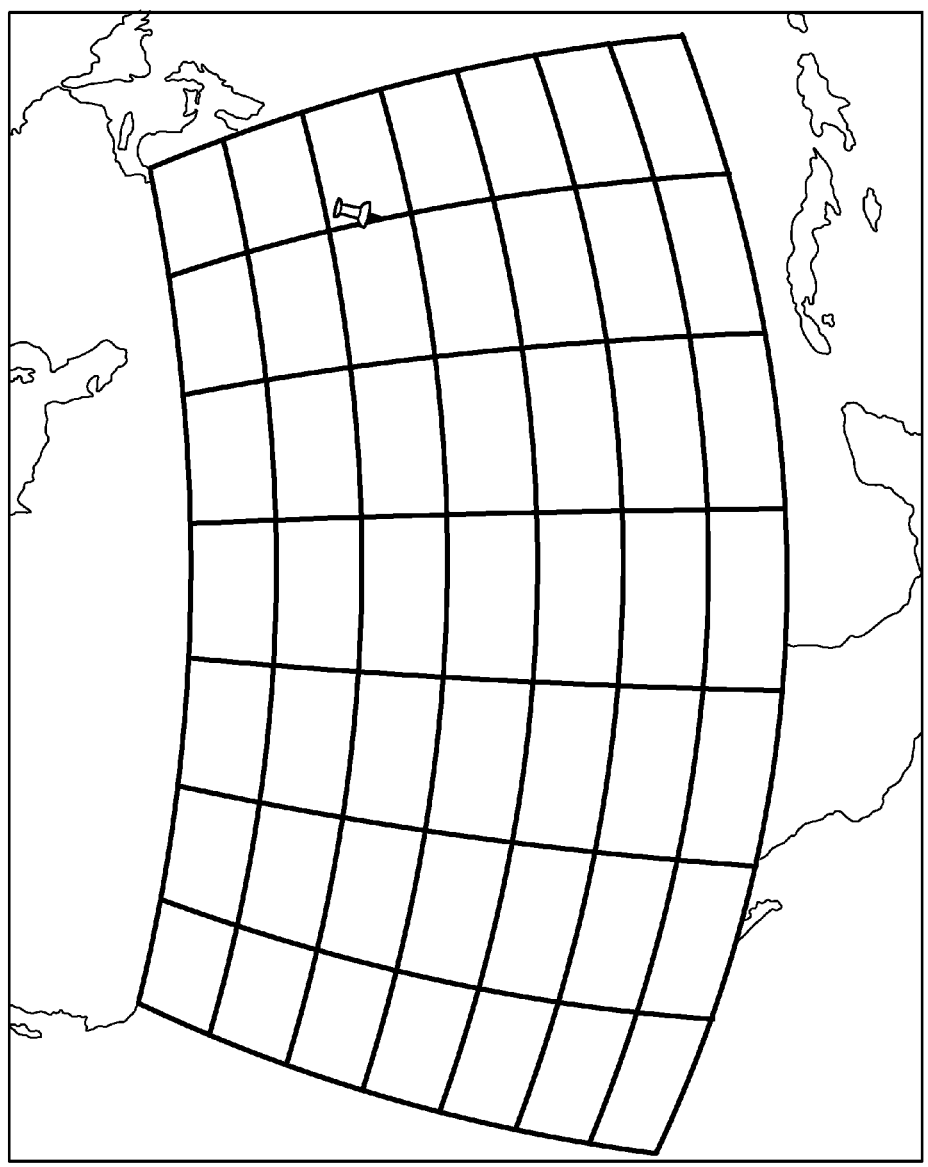
FIGS. 5A-5D, 6, and 7 are illustrative maps showing exemplary geographical regions according to the methods of FIGS. 3 and 4.

In 304, the macro region may be divided into a plurality of regions. For example, the macro region may be initially divided via a number of different divisions. In one embodiment, the macro region may be divided into one or more different grids, e.g., 3×3 grids, 5×5 grids, 7×7 grids, 9×9 grids, etc. In one embodiment, these grids may be evenly divided horizontally and vertically. For example, FIG. 5A represents a 7×7 grid applied to a macro region which includes the Unites States and the source location is Philadelphia (in this case with a ground shipping method). However, in other embodiments, the grids may be divided unevenly, e.g., based on population density, transit characteristic data density, zip code density, etc.

In further embodiments, the macro region may not be divided into rectangular regions, but may instead be divided into polygons (e.g., where n is greater than 4). For example, the regions may be based on the polygons of postal codes. In one embodiment, a region (e.g., even the macro region above) may be the combination of a plurality of zip codes. However, other embodiments are envisioned, e.g., where the polygons are based on counties, states, countries or sizes greater than postal codes. Alternatively, polygons smaller than postal codes may be used, e.g., in areas of high density, such as in New York City. Thus, each region may be formed as a unique polygon within the macro region.

Figure 5B:
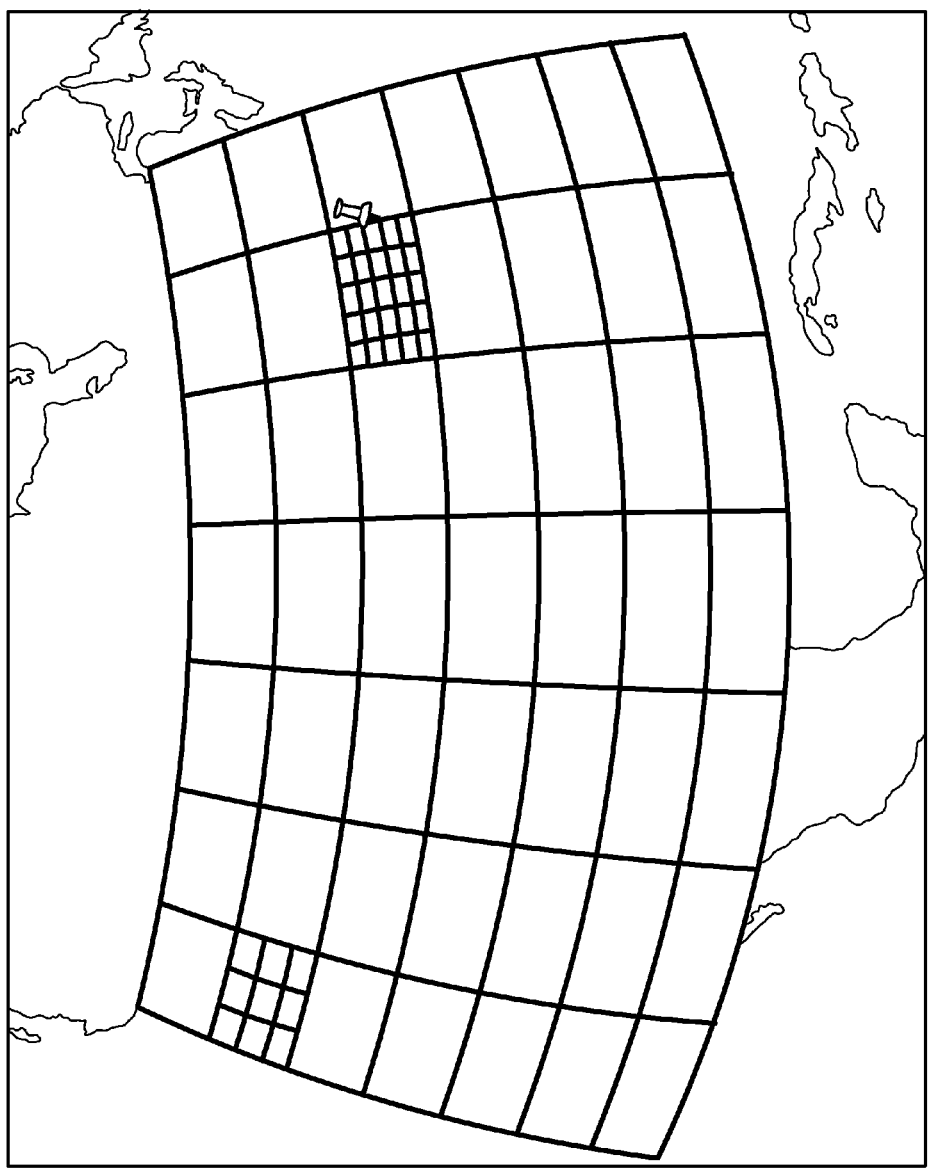

Each of the initial regions may further be divided, e.g., using the same or a different division algorithm used to generate the initial regions. For example, at least one of the initially divided regions may be further divided to form the plurality of regions in 304. However, in one embodiment, the regions may not be divided if a minimum threshold of values of transit characteristics (e.g., observations) is not met. For example, in one embodiment, if the resulting regions do not meet the threshold (e.g., 10 observations, 25 observations, 50 observations, 100 observations, 500 observations, etc.), the region may not be divided. FIG. 5B illustrates such an embodiment after the division of 304. As shown, the macro region was initially divided in a 7×7 grid and the Washington state area was further divided into a 3×3 grid as well as the Pennsylvania area into a 5×5 grid. Thus, in 304, the macro region may be divided into a plurality of regions according to various different methods. Note that the plurality of regions may be the regions resulting from the initial divisions described above or from further divisions. Thus, the plurality of regions may be the result of any number of divisions from the macro region, as desired.

In 306, the regions formed in 304 may be further divided to create additional regions and/or the regions may be expanded to form new regions. For example, the regions may be divided according to any of the splitting methods described in 304 to produce the additional regions. Similar to above, the regions may not be divided if the resulting regions do not meet a minimum observation threshold.

Figure 5C:
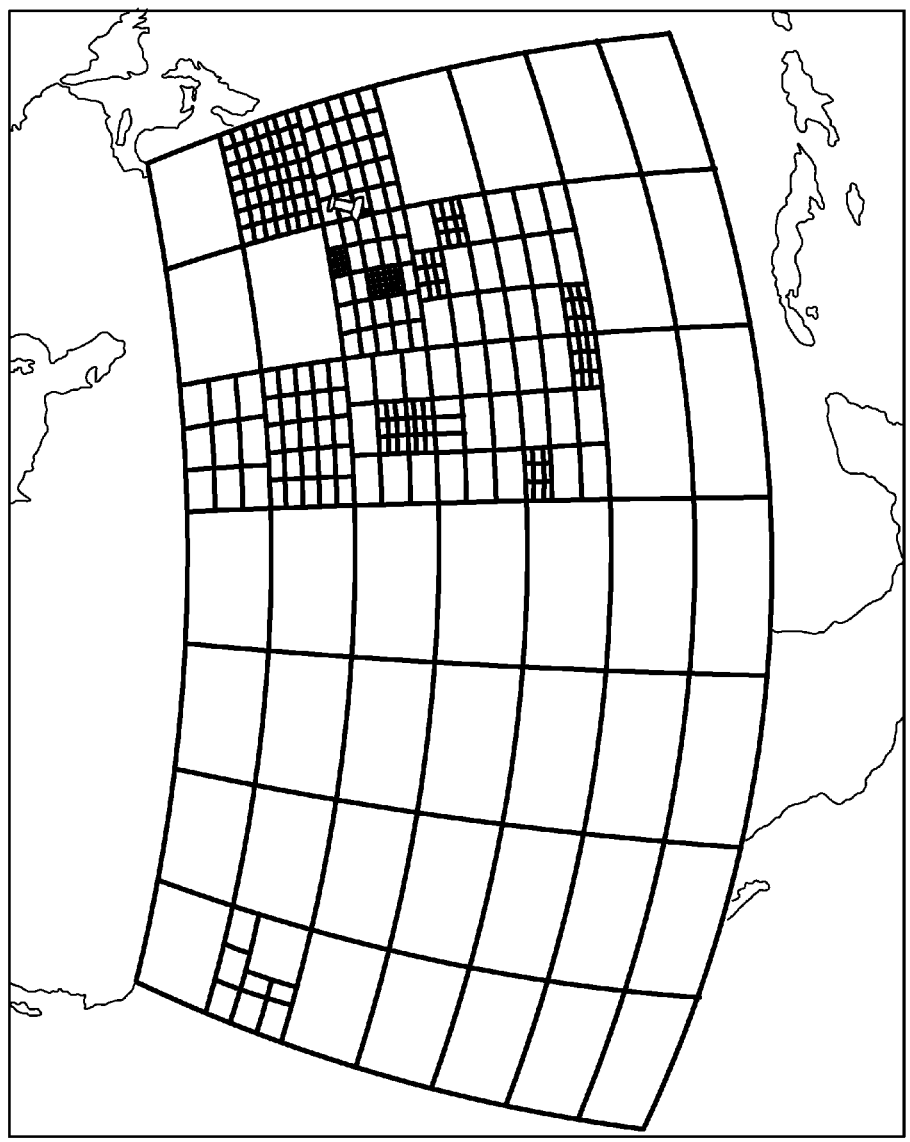

The regions may also be expanded to form new regions. The expansion may be performed in any of numerous ways. For example, regions may be expanded by combining a plurality of regions to form a larger region. Alternatively, or additionally, where the region is defined as a rectangle, one or more of the sides of the rectangle may be expanded outward to form a larger rectangle. Similarly, polygons may be expanded by expanding the sides of the polygons or by combining other polygons (e.g., other zip code polygons). The expansion of rectangles or polygons may be based on a number of observations within the region. For example, the rectangle or polygon may be expanded until it reaches a threshold number of observations. Alternatively, or additionally, the region may be expanded until it reaches another region or destination which already includes a threshold number of observations. For international shipping, in some embodiments, the expansion may be limited to a country size, although other maximum sized regions are envisioned, such that it does not exceed a shipping hub size, as described above. FIG. 5C illustrates one set of possible regions for the macro region which has been divided and expanded a plurality of times. As shown, numerous areas have been divided into various n×n grids. Additionally, the Washington state area also includes an expanded region.

In some embodiments, a fitness function may be used to determine whether to further divide any particular region. Similarly, the fitness function may be used to determine whether to expand a particular region, and possibly, how much to expand a particular region. For example, the fitness score (returned by the fitness function) may be compared for a region before and after being divided and expanded. The division or expansion may be performed when the resulting region(s) have a higher fitness score.

The fitness function may take transit data (e.g., observations) that is within a region (or potential region) as input and may provide a fitness score. The fitness score may reflect various types of transit characteristics or desirable attributes depending on how the fitness function is defined. For example, where the fitness function is based on transit latency, a higher fitness score may be returned for a region that has a lower transit latency than one that does not. The fitness function may also receive surety as an input. For example, the input surety may specify return higher fitness scores for those regions with a lower latency at a specified surety, or, additionally or alternatively, with a higher surety value. Similarly, the fitness function may be based on transit variability. In this embodiment, the fitness function may return higher fitness scores for those regions which have a lower variability in transit times. In further embodiments, the fitness function may associate cost savings with certain shipping latencies (e.g., a higher cost savings on lower shipping latencies) and the fitness function may return a higher fitness score for those regions which have better cost savings. Additionally, the fitness function may also include distance as a cost. For example, this may be used to ensure that the regions are not unrealistic in nature, e.g., since it is known that one shipping hub cannot server greater than a certain distance (e.g., 500 miles), the regions would be limited to below such a distance. Thus, depending on the definition or criteria used in the fitness function, different transit characteristics or transit attributes (such as cost savings) may return better fitness scores, thereby affecting region creation, as described herein.

The following is code for two exemplary fitness functions:

```
/**
* Method to determine the fitness of a given transit time
* This will need to be extended in the future to allow for more
  robust fitness functions
* @param point The geographic point to get the fitness for
* @param region the region the point belongs to
* @param surety the surety level we are operating at
* @return the fitness of said transit time
*/
public double getFitnessForTransitTime(GeographicPoint point, TransitTimeRegion region, double surety);
One (cost saving fitness function):
public double getFitnessForTransitTime(
    GeographicPoint point,
    TransitTimeRegion region,
    double surety) {
    int transitTime=-1;
    if(region !=null) {
    transitTime=region.getTransitTimeAtSurety(surety);
    }
    //Relative cost savings . . .
```

```
//1 day is 25
//2 day is 10
//3 day is 1
//Everything else is not worth mentioning
if(transitTime==48) {
return 10;
{else if(transitTime==24||transitTime==0) {
return 25;
{else if(transitTime==72) {
return 1;
{else if(transitTime>72) {
return -((transitTime/24)-4);
{else {
return -5;
}
}
}
Two (variance fitness function):
public class EadDeltaFitnessFunction implements IFitness-
Function {private ObservationSet observationSet;
    public EadDeltaFitnessFunction(ObservationSet observa-
       tionSet) {this.observationSet=observationSet;
    }
    @Override
    public double getFitnessForTransitTime(GeographicPoint
       point, TransitTimeRegion region, double surety) {
       if(region==null) {return 0;}
       TransitTimeHistogram  histogram=observationSet.get
          (point);
       if(histogram==null) {return 0;}
       double fitness=0;
       int regionTransitTime=region.getTransitTimeAtSurety
          (surety);
       for(int obersvationTransitTime: histogram.keySet( )
          {long deltaEad=Math.abs((obersvationTransitTime-
          regionTransitTime)
* histogram.get(obersvationTransitTime));
       fitness+=deltaEad;
    }
    return—fitness/(double)histogram.getTotalObservations(
       )
}
```

The divisions and expansions of 306 may be performed a plurality of times to generate a plurality of possible sets of regions. For example, in one embodiment, the regions from the macro region may be generated in an iterative manner to generate the plurality of possible sets of regions, e.g., for the entire macro region. For example, FIGS. 5A, 5B, and 5C are each possible sets of region for the entire macro region. However, the sets of regions may be localized to within the one or more regions generated in 304 above, and the selected set of regions may be within one of these regions. For example, the sets of potential regions could be localized to the Washington state area shown, three such sets shown in FIGS. 5A-5C. Thus, in this embodiment, each set of possible regions may not refer an entire set for the macro region, although this is possible.

In 308, each set of possible regions may be evaluated using the fitness function. More specifically, in one embodiment, each region of each set may be evaluated using the fitness function, and the fitness scores for each set of regions may be summed and compared. Accordingly, the set of possible regions with the best (e.g., the highest) fitness score may be selected. As indicated above, the evaluation in 308 may be performed at a local level (e.g., for one particular region within the macro area) or at the macro area level. Where the evaluation in 308 is performed at a local level, it may be performed repeatedly to select a set of regions for the macro area.

In some embodiments, the division in 304, the divisions and expansions of 306, and the evaluation in 308 may be implemented in a recursive manner. This particular embodiment of 304-308 is presented in FIG. 4 and described below. However, it should be noted that the method of FIG. 4 is not separate from the method described herein regarding FIG. 3, but is instead one particular implementation for achieving the steps of 304-308.

Accordingly, in 310, a set of regions may be selected for the macro area based on the evaluation in 308. The selected set of regions for the macro area may have a highest fitness score for the macro region, based on the particular set of divisions and expansions performed in 304 and 306. Thus, the method of FIG. 3 may return a set of regions for an initial macro area that maximizes whatever transit characteristics or derived attributes that are specified in the fitness function, including, for example, transit latency, transit variability, cost, etc.

Figure 5D:
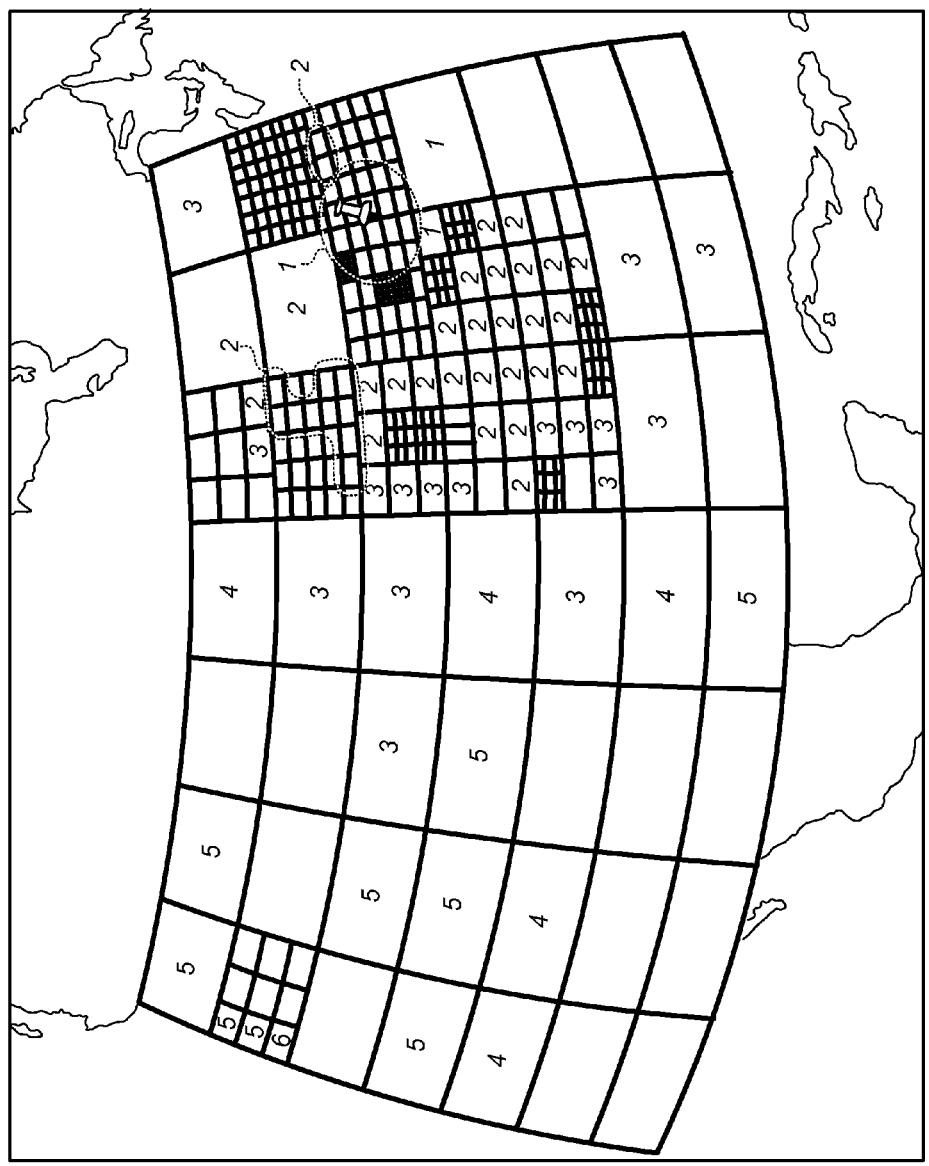

In 312, a regional value of a transit characteristic may be determined for at least one region in the selected set of regions of 310. The regional value may provide a transit characteristic value for each destination within the respective region. FIG. 5D illustrates the map of FIGS. 5A-5C with regional values provided for a plurality of the regions. As shown, transit latencies generally expand outward from the origin (transit latency of 1) to the exterior regions. In some embodiments, such a map would be presented in color with a color code. As a result, many of the smaller regions are not labeled do to size constraints, but generally follow from the pattern shown in the map. Additionally, where data is unavailable in certain regions, no color, or black may be shown. As shown in the map, the regions resulting from the fitness function may generally produce smaller regions where more observations are present, e.g., where population density increases. However, this is a result of the fitness function used and may vary depending on the provided criteria.

Further embodiments describing the use of the selected set of regions are provided below.

As indicated above, FIG. 4 illustrates one embodiment implementing steps 304-308 in a recursive manner. As shown:

In 402, a region may be selected. The region may be the macro area, a region divided from the macro area, or any region during the recursive method.

In 404, based on a determination to divide the region, the region may be divided into n sets of subregions. For example, as described above, the region may be divided into several different sets of grids (e.g., 3×3, 5×5, 7×7, etc.). Alternatively, other methods of divisions may be used, e.g., polygon based, possibly using postal codes or counties, etc. As also indicated above, the decision of whether to divide the region may be based on a threshold number of observations for each subregion. For example, the region may not be divided unless each subregion has a number of observations greater than the threshold number. In further embodiments, the region may only be divided into subregions if the division results in a higher fitness score from the fitness function.

As indicated in FIG. 4, the function may recur in 404, back to 402, to select one or more subregions (e.g., each subregion) of the plurality of subregions created in 404.

In 406, for each set of subregions, one or more subregions within the region may be expanded, e.g., if it is determined that the expanded subregion has a greater fitness score than the original subregion. Thus, within the, e.g., 3×3 grid, one or more of the subregions may be expanded. Additionally, within the, e.g., 5×5 grid, one or more of those subregions may be expanded.

Steps 404 and 406 result in the generation of a plurality of possible sets of regions for the region selected in 402. These plurality of possible sets of regions include the originally divided grids from 404, the expanded subregions in 406, as well as the recurring divided and expanded grids that are returned from the lower level recursive function. Accordingly, in 408, each set of possible regions is evaluated using the fitness function to return a fitness score for the set of possible regions, and in 410, the selected set of regions for the selected region may be returned (e.g., for inclusion as a set of possible regions in the parent level selected region).

Thus, the method of FIG. 4 may be performed for each selected region, in a recurring fashion. Accordingly, because of recursion, the selected set of regions for the selected region is generated by in part maximizing each fitness score of each region within the selected region.

The following is brief pseudo code describing an exemplary embodiment of the recursion above:

```
makeTreeRegion {
for(i : number of splits)
        for(j : number of splits)
                observationSet = findObservationsInMySplit(i,j)
                subRegion[i][j] = makeOptimalChildNode(observationSet,i,j)
        done
done
}
makeOptimalChildNode {
    for(possibleRegionalization) //one such possible regionalization is
another makeTreeRegion itself
        fitness = fitnessFunction.computeFitness(possibleRegionalization)
        if(fitness > maxFitness) then bestRegion = possibleRegionalization
    done
    return bestRegion;
}
```

The following is more in depth pseudo code describing an exemplary embodiment of the recursion above:

```
private void buildRegionTree(ObservationSet observationSet) {
    GeographicPoint topLeft = this.encapsulatingRegion.getTopLeft( );
    //Split the current region into numberOfSplits pieces both horizontally
and vertically
    for(int i = 0; i < numberofSplits; i++) {
        for(int j = 0; j < numberOfSplits; j++) {
            //Form the subregion and populate its points
            GeographicRegion currentRegion =
makeRegionChildNode(currentTopLeft,i,j);
            //The observations in the region, aka the baselineObservations
                ObservationSet pointsInRegion     =    findPointsInRegion
(currentRegion, observationSet);
            //Decide whether to make a leaf or recursively optimize based on
            //observation count
            if(observationCount is too small) {
                    subRegions[i][j]    =    new    TransitTimeRegionLeaf
(currentRegion, pointsInRegion);
            } else {
                //Construct a fitness function for this given region with the
baseline observation set being the points in the region
                        TransitTimeRegionSetFitnessFunction
fitnessFunction    = TransitTimeRegionSetFitnessFunction.
buildFromHistograms(
                    pointsInRegion,
                    new BasicFitnessFunction( ));
                //Evaluate fitness of each subregion and return the best
                subRegions[i][j]    =    findBestSubRegion(currentRegion,
pointsInRegion, fitnessFunction);
            }
        }
    }
}
private TransitTimeRegionCollection findBestSubRegion(
        GeographicRegion currentRegion,
        ObservationSet pointsInRegion,
        TransitTimeRegionSetFitnessFunction fitnessFunction) {
        List<TransitTimeRegionCollection>
possibleRegionalizations    =    new LinkedList
<TransitTimeRegionCollection>( );
    //Construct all other region types here and add them to
    //Examples include other region splits, region leaf, vector/rastor
based region grower, random regionalizer
            possibleRegionalizations.add(new    TransitTimeRegionLeaf
(currentRegion, pointsInRegion));
    possibleRegionalizations.add(new RegionGrower(pointsInRegion));
            possibleRegionalizations.add(new    TransitTimeRegionTree
(currentRegion, pointsInRegion, numberofSplits, minimumObsCount));
    //Basic find the max value in a list
    double maxFitness = Double.NEGATIVE_INFINITY;
    TransitTimeRegionCollection bestRegionSet = null;
    for(TransitTimeRegionCollection regionSet :
possibleRegionalizations) {
        double fitness = fitnessFunction.getRegionSetFitness(regionSet);
        if(fitness > maxFitness) {
            bestRegionSet = regionSet;
            maxFitness = fitness;
        }
    }
    return bestRegionSet;
}
/**
 * This method determines the fitness of a given region set
 * @param regionSet the region set in question
 * @return the fitness for the baselineObservations and
fitnessFunction defined
 */
public double getRegionSetFitness(ITransitTimeRegionCollection
regionSet) {
    double totalFitness = 0;
    long obsTotal = 0;
    //We have a set of observations to optimize over, it's a lat long point
key and count value
    for(GeographicPoint point : baselineObservations.keySet( )) {
        double fitness = fitnessFunction.getFitnessForTransitTime(
            point,
            regionSet.getRegionForPoint(point),
            surety);
        //Weight it by observation count
        int observationCount = baselineObservations.get(point);
        totalFitness += (fitness * observationCount);
        obsTotal += observationCount;
    }
    return (totalFitness / (double)obsTotal);
}
```

In some embodiments, the method of FIGS. 3 and 4 may be performed iteratively to incorporate new transit data, e.g., new observations. More specifically, the method may be performed dynamically in response to new data, e.g., in real time. Thus, the algorithm may be applied in real time to transit data as it is received. In one embodiment, to achieve this functionality, the new transit data may be combined with old transit data, and the method may be performed on the combined data. However, in one embodiment, the method may not be completely re-performed when new data is received. For example, where data is received and the region it affects increases its fitness score, the region may remain the same. However, where data is received and the region it affects decreases (i.e., worsens) its fitness score, the method may be re-performed, e.g., for all of the data or for the container region that the region falls within.

Alternatively, or additionally, the method may be performed only on the new transit data, e.g., for verification purposes. In further embodiments, the data used for creating the regions may be a moving window, e.g., the last 1, 2, 3, 6, 12 months of shipping data. Additionally, or alternatively, the method may simply be performed on a timed schedule or when a threshold amount of new data has accumulated, as desired. Alternatively, instead of excluding data, e.g., based on the time, observations or transit characteristics may be weighted differently based on various attributes (e.g., where older transit characteristics are weighted less than new characteristics), as desired. Such weighting may be specified manually or automatically.

Additionally, the method of FIGS. 3 and 4 may be repeated a plurality of times for different shipping methods and/or different source locations. Thus, the method of FIGS. 3 and 4 may be applicable for any source location and any shipping method. In further embodiments, multiple source locations and/or shipping methods may be combined to form aggregate regions.

FIGS. 5A-7 illustrate exemplary regions and groupings, resulting from the method of FIGS. 3 and 4 above. FIGS. 5A-5D have already been described with respect to FIG. 3.

Figure 6:
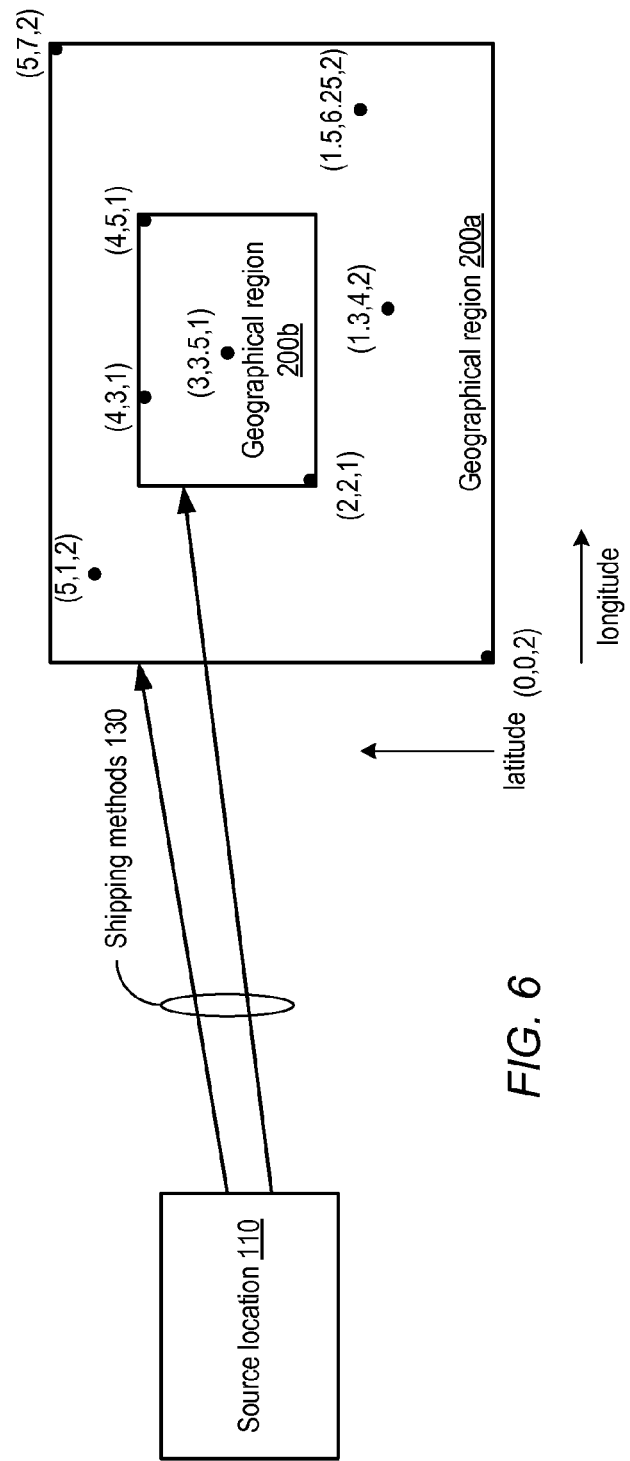

FIG. 6 illustrates one example of the grouping of destinations 120 into regions. In the illustrated embodiment, individual destinations 120 are identified using a coordinate system, such as a latitude-longitude coordinate system, a two-dimensional Cartesian coordinate system, or another suitable coordinate system. For purposes of explanation, a quasi-Cartesian latitude-longitude coordinate system will be assumed, although embodiments are not limited to such a system.

In FIG. 6, a number of destinations 120 are illustrated as solid circles, and empirical transit time data for each destination 120 is illustrated as a tuples of the form (latitude, longitude, latency) near each circle, where latency is the transit time (e.g., in days) from a particular source 110 to the destination 120 designated by latitude and longitude, although further information may be used, as described above. In the regions shown in FIG. 6, the geographical region 200a may include destinations whose latency is less than 2, while the interior region 200b may include destinations whose latency is 1. As shown in FIG. 6, depending on the grouping method, it is possible for regions 200 to overlap or for one region 200 to be located entirely within another. In some embodiments regions 200 may be rectangular or approximately rectangular. However, depending on the coordinate system employed, other region shapes are possible (e.g., in a polar coordinate system, circular regions may be easier to manipulate than rectangular regions).

Figure 7:
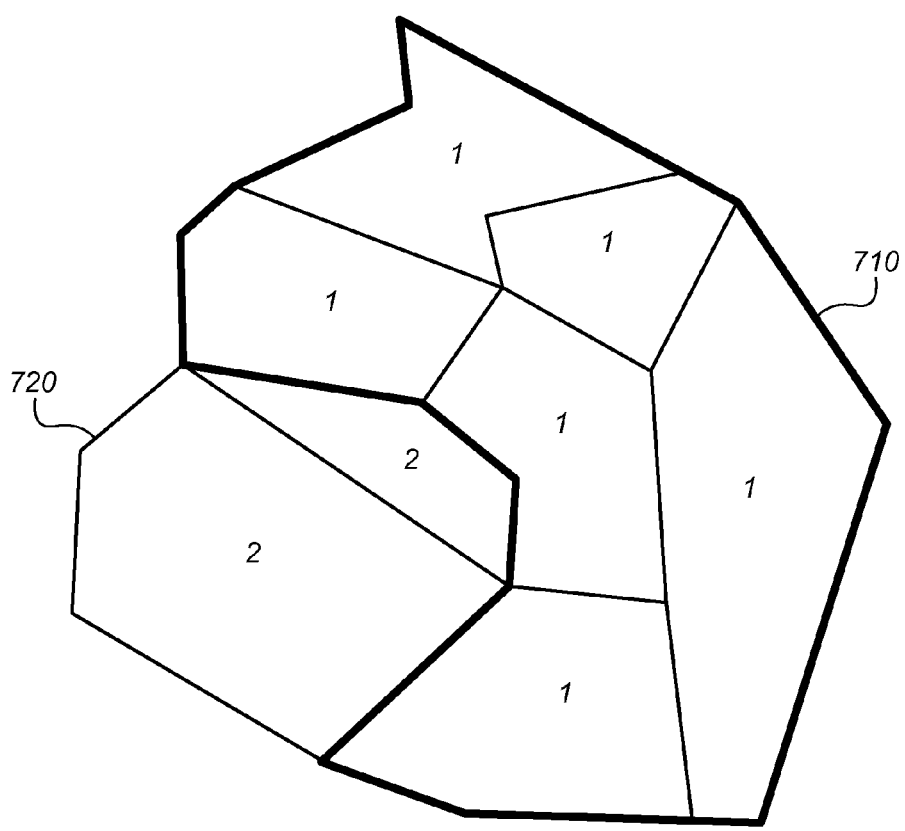

FIG. 7 illustrates a grouping of destinations where polygons are used instead of rectangles. This embodiment may be particularly useful when postal code polygons are used for forming regions. In this particular case, the polygons 710 all have a transit latency of 1 whereas the polygons 720 have a higher transit latency of 2. In this case, because polygons are used instead of rectangles, a concave region 710 may be formed which provides a more accurate region of the transit times than a rectangle would. More specifically, were these latencies represented in a single rectangle, the latency would increase, which is undesirable. Alternatively, multiple rectangles would have to be used to form an approximation of the polygon shape, resulting in many unnecessary regions, which is also undesirable. Thus, FIG. 7 illustrates an exemplary grouping of polygons which may result from the method of FIGS. 3 and 4.

Predicting Transit Characteristics Using Regions

It is noted that the number of regions generated for a given set of transit characteristic data may be substantially fewer than the number of tuples themselves. Consequently, prediction of a transit time or other transit characteristic to a given destination 120 may be reduced to a matter of determining the region in which given destination 120 belongs, rather than searching a large quantity of transit time data for a data corresponding to given destination 120. That is, prediction of a transit characteristic of a given destination 120 may be reduced to a problem of determining set membership (e.g., region membership) of given destination 120, rather than a problem of determining historical data specific to given destination 120, which may not exist or may be insufficient for prediction.

It is also noted that, depending on how transit characteristics are distributed among destinations 120, in some embodiments, destinations 120 may be grouped into multiple discontiguous regions. For example, in one embodiment destinations 120 may exhibit transit latencies that are clustered around the locations of shipping hubs. In such an embodiment, several discontiguous "island" regions having similar latencies or latency distributions may be formed around the shipping hubs and separated by regions 200 having dissimilar latencies or distributions.

Figure 8:
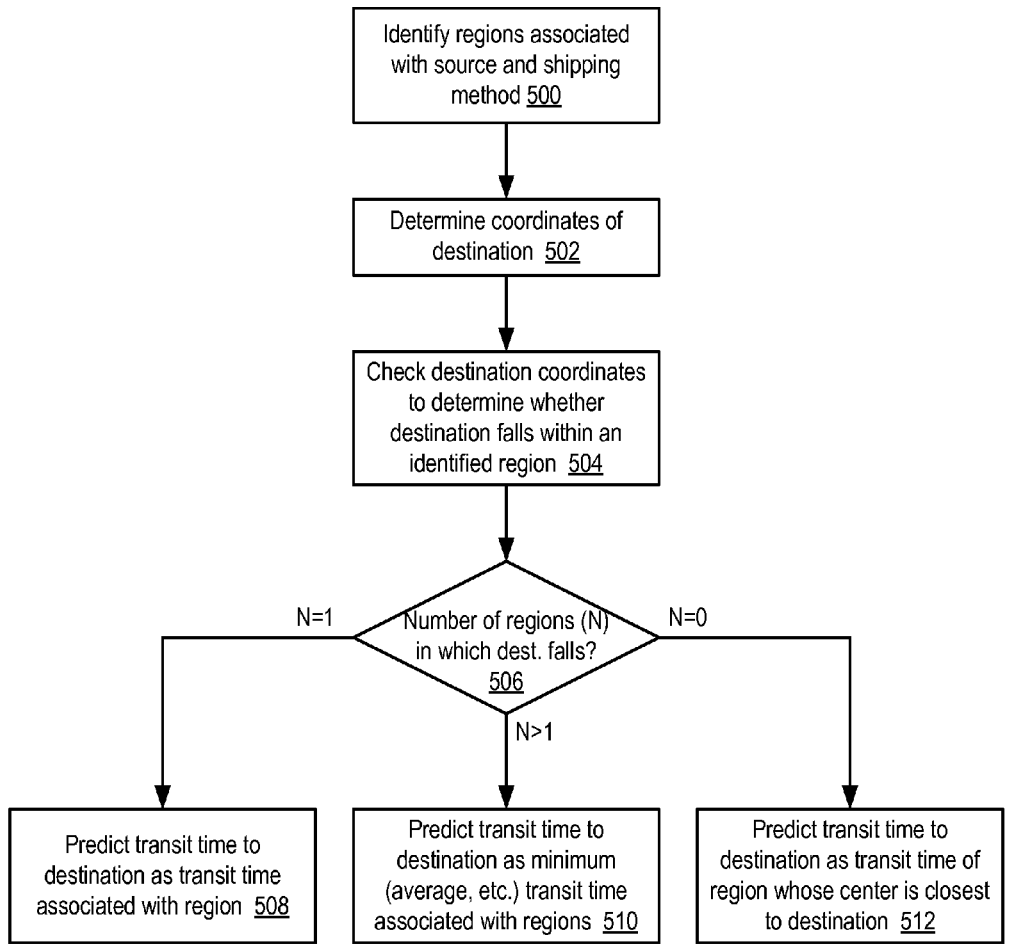
FIG. 8 is a flow diagram illustrating one embodiment of a method of predicting transit time to a destination using geographical regions.

One embodiment of a method of predicting transit time of a shipping method 130 from a given source 110 to a particular destination 120 using regions is illustrated in FIG. 8. Referring collectively to FIGS. 1-8, operation begins in block 500 where the regions associated with source 110 and shipping method 130 are identified. However, in some embodiments, regions may be generated for multiple different sources 110 and multiple different shipping methods 130 from a given source 110.

Next, the coordinates of destination 120 are determined (block 502). For example, if destination 120 is specified as a shipping address including a postal code, the address may be translated into the appropriate coordinate system (e.g., latitude, longitude). Such a translation may be performed by, e.g., consulting a mapping service to obtain precise coordinates, or in some embodiments by simply mapping a portion of the postal code or destination city to a representative set of coordinates.

The coordinates of destination 120 are checked against the previously identified regions to determine whether they fall within one or more regions (block 504). Generally speaking, for a region whose dimensions are given as <(lat1,lon1), (lat2,lon2)> as described above, a destination having coordinates (lat,lon) may fall within the region if both lat1≦lat≦lat2 and lon1≦ion≦lon2. For example, a destination 120 having coordinates (3.5, 3.5) falls within both regions 200a and 200b of FIG. 6, while a destination having coordinates (5.7, 6) falls only within region 200a.

If destination 120 falls within exactly one region, the predicted transit time to destination 120 is the transit time associated with that region (blocks 506, 508). If destination 120 falls within more than one region, the predicted transit time to destination 120 may be chosen as the minimum transit time associated with the regions 200 to which destination 120 belongs (blocks 506, 510). (In alternative embodiments, if the regions to which destination 120 belongs are not completely overlapping, a less optimistic selection of transit time may be chosen, e.g., by averaging the transit times of the regions.) However, it should be noted that regardless of how the regions were originally produced (e.g., regardless of the criteria used in the fitness function), data may be extracted according to any of various criteria. For example, where a specific surety (or no surety) was used to generate the regions, during data extraction, any surety level or other criteria may be used. Thus, the extraction of data from a region may not be limited to the method by which the regions were originally created.

Destination 120 may not fall within any defined region, for example if it is located in an area with little or no prior shipping history. If this is the case, in one embodiment the transit time of the region whose center is closest to destination 120 may be chosen as the predicted transit time for destination 120 (blocks 506, 512). In some embodiments, if one or more regions are completely enclosed by another region, only the center of the outermost region may be considered. For example, referring to FIG. 6, a destination 120 having coordinates (10, 11) falls outside of region 200a. There being no other defined regions nearby, transit time associated with this destination may be predicted to be the transit time of region 200a (e.g., 2). It is noted that in some instances, transit time predictions associated with destinations 120 that fall outside of known regions 200 may be considerably inaccurate, and in some embodiments such predictions may be treated as exceptional cases (e.g., flagged for special handling).

It is noted that in some embodiments, as indicated above, regions may not be static, but rather may be dynamically redefined as additional empirical transit time data is collected. For example, in one embodiment the grouping algorithms of FIG. 3 or 4 may be performed in real time (e.g., continuously) or at intervals (e.g., weekly, monthly, etc.) to take into account underlying changes in the transit time performance of a given shipping method 130. For example, if a common carrier changes its schedule, its capacity between various hubs, or other logistical factors, transit time to different destinations 120 may correspondingly change. Regenerating regions to align them with current empirical data may assist in maintaining overall predictive accuracy (or cost savings) of regions, in contrast to conventional region mapping techniques that may be based on relatively static geographical or political boundaries that may bear little relationship to transit time behavior.

However, in some embodiments, not all fluctuations in empirical transit time data may be reflected in regions. In one embodiment exceptional, transient or anomalous transit time data may be excluded from the region-generating process. For example, weather conditions may cause temporary delays in shipping to a particular geographical area that are not indicative of a change in steady-state shipping behavior. Correspondingly, transit time data reflecting such delays may be excluded from transit time modeling, so as not to skew transit time predictions.

Note that the prediction of transit characteristics described herein may be used in conjunction with the embodiments described in U.S. patent application Ser. No. 11/506,721, titled "Selected Shipping Methods Dependent on a Dynamic Model of Shipping Activity", which was incorporated by reference in its entirety above.

Model Implementation

Figure 9:
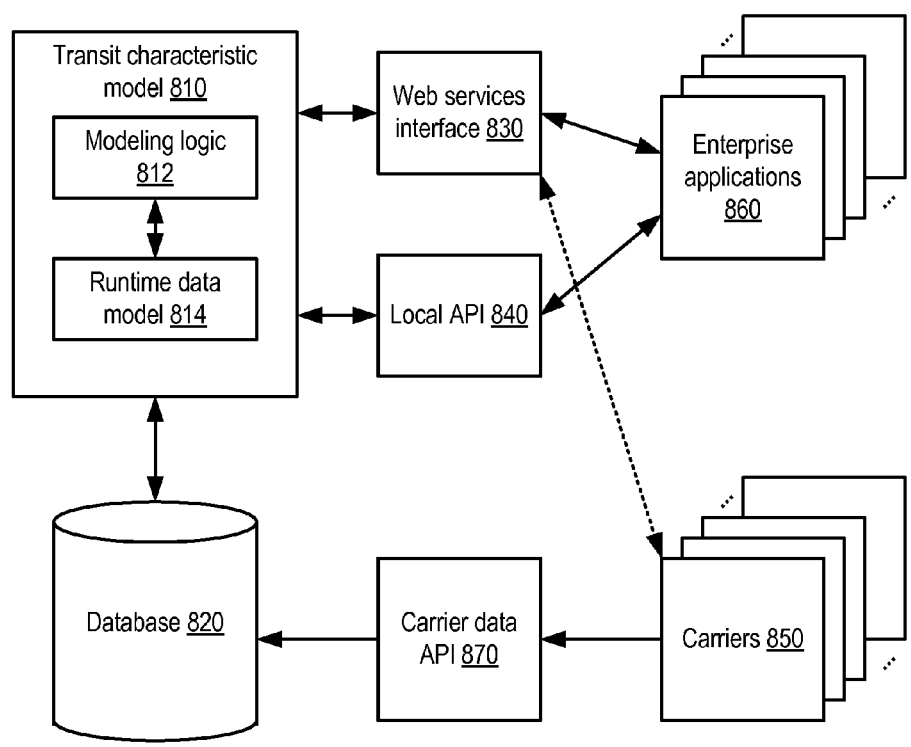
FIG. 9 is a block diagram illustrating one embodiment of a system including a predictive transit time model.

FIG. 9 illustrates one exemplary embodiment of a system including a predictive transit characteristic model configured to generate and utilize regions and associated distribution information as described above. In the illustrated embodiment, transit characteristic model 810 includes modeling logic 812 and runtime data model 814, and is configured to interact with transit characteristic database 820. Additionally, transit characteristic model 810 is configured to interact with a number of enterprise applications 860 via web services interface 830 and via local application programming interface (API) 840. Further, a number of transit carriers 850 are configured to interact with transit characteristic database 820 via carrier data API 870.

In one embodiment, transit characteristic model 810 may be configured to perform the general functions of acquiring transit characteristic data, for example from transit carriers 850, grouping such data into regions, and determining probability distribution parameters associated with regions, for example as described above in conjunction with the descriptions of FIGS. 1-8. In one embodiment, for example, transit characteristic model 810 may be configured to collect and model transit latency data, and may be referred to as a transit time model. Additionally, transit characteristic model 810 may be configured to make various types of model-based predictions as described in greater detail below. In some embodiments, transit characteristic model 810 may also include certain business rules or other policies that may influence modeling and prediction, or may be configured to obtain such rules or policies from another source. For example, in some embodiments, certain items may not be allowed to be shipped via certain shipping methods 130 or to certain destinations 120. Transit characteristic model 810 may take such policies into account, for example by returning an error condition or selecting an alternate value (e.g., an alternate shipping method 130) if a transit time prediction for an illegal combination of inputs is requested. In other embodiments, policy logic may be implemented externally and transparently to transit characteristic model 810.

In the illustrated embodiment, modeling logic 812 may be configured to implement specific procedures, functions, or other types of processing routines corresponding to the general functions implemented by transit characteristic model 810, including data acquisition functions, data analysis and modeling functions, and model querying or predictive functions. In contrast, runtime data model 814 may be configured to implement the data upon which modeling logic 812 operates as described below. However, this distinction is purely illustrative, and various implementations of transit characteristic model 810 may employ different partitions of functionality. As described in greater detail below, it is contemplated that in some embodiments, transit characteristic model 810 may be implemented as program instructions and data stored on a computer-accessible medium and executable, e.g., by a processor, to perform the functions of the model.

In the illustrated embodiment, database 820 may be configured to store the various types of data utilized in transit characteristic modeling. For example, individual transit characteristic data points (e.g., observations) collected from carriers 850 may be stored as tables or records within database 820, as may other data derived from such data points such as identities of sources 110, dimensions of regions, distribution parameters associated with regions, as well as any other data generated or required by transit characteristic model 810. In various embodiments, database 820 may be implemented as a relational database or as a nonrelational database storing structured data (e.g., data formatted according to a version of eXtensible Markup Language (XML) or another suitable markup language).

Transit characteristic data may be received and stored within database 820 through a different interface from the interface used to access transit characteristic model 810. For example, in the illustrated embodiment, carriers 850 (or applications hosted by the carriers) may be configured to convey transit characteristic data, such as tracking data or other records, to database 820 for storage via carrier data interface 870. In various embodiments, carrier data interface 870 may be configured to implement electronic data interchange (EDI) functionality according to various EDI standards. For example, interface 870 may be configured to implement a version of the American National Standards Institute (ANSI) X12 EDI standard, a version of the Electronic Data Interchange for Administration, Commerce and Transport (EDIFACT) standard, or another suitable standard.

In various embodiments, transit characteristic data may be conveyed from carriers 850 to database 820 in the form of EDI documents, text files, structured data such as XML-formatted data, or in another suitable format. In one embodiment, carrier data interface 870 may be configured to implement various functions to coordinate the extraction and transformation of characteristic data records into a format suitable for storage in database 820, as well as the actual loading of transformed data into database 820.

It is noted that although the illustrated embodiment shows a distinct path through which carrier data may be loaded into database 820, it is contemplated that in some embodiments, carrier data may be obtained from carriers 850 by transit characteristic model 810 via web services interface 840. That is, in such embodiments, model 810 may make standard web services calls, as described in greater detail below, to obtain transit characteristic data.

Database 820 may be particularly suited for storing and querying large quantities of varied data. However, in some embodiments the structure of region data stored by database 820 may not be well suited for dynamic processing by transit characteristic model 810. For example, database 820 may be configured to store each unique combination of source 110, shipping method 130 and region as a distinct row or record without any explicit representation of the relationships that may exist among regions (e.g., the relative geographical positioning of regions). Consequently, searching database 820 to identify the record corresponding to a desired source-destination-shipping method combination may require an exhaustive search of all of the regions for which the desired source and shipping method match records in database 820.

To improve runtime performance, in the illustrated embodiment transit characteristic model 810 includes runtime data model 814. In one embodiment, runtime data model 814 may be configured to represent some or all of the source-shipping method-region associations reflected within database 820, but using a more efficient data representation that reflects spatial relationships among different regions, for example by mapping records from database 820 into a tree structure rather than a table structure. One exemplary data structure that may be employed by runtime data model 814 is referred to R-Trees and is described in greater detail in, for example, A. Guttman, "R-Trees: A dynamic index structure for spatial searching," in Proceedings of the Association of Computing Machinery (ACM) SIGMOD International Conference on Management of Data, 1984, pp. 47-57. In some embodiments, tree structures such as R-Trees may reduce the worst-case search depth of N records from, e.g., O(N) to O(log N). However, any data structure suitable for searching of spatial or geographical data may be employed by runtime data model 814.

Generally speaking, carriers 850 may include any suitable sources of transit time data that may be used by transit characteristic model 810. Typically, carriers 850 may include any suitable type of common or private carrier that may implement a shipping method 130 as described above. In some embodiments, carriers 850 may make transit time data (e.g., tracking data) available for querying for web services interface 830, while in other embodiments transit time data may be delivered by or retrieved from a carrier 850 via a proprietary API such as API 840. For example, in some embodiments a carrier 850 may deliver to an enterprise current tracking data for all shipments currently in transit on behalf of the enterprise in the form of electronic business documents that may be transmitted, e.g., several times per day. In other embodiments, the enterprise may collect tracking data by submitting requests for data on particular shipments.

As mentioned previously, transit characteristic model 810 may make various modeling functions available to enterprise applications 860, either as web services via web services interface 830, or as local or proprietary functions accessible via API 840. Generally speaking, web services describes a general programming model through which computational services may be made available to different requestors in a platform- and programming-language independent manner. Web services interface 830 may encompass any of a number of protocols that may be used to present a computational service as a web service, such as a version of the XML protocol for encoding documents, a version of Simple Object Access Protocol (SOAP), a version of Web Services Description Language (WSDL), or other related protocols.

In various embodiments, enterprise applications 860 may encompass any applications that may require or benefit from access to historical transit time data or predicted transit time behavior. For example, enterprise applications 860 may include customer ordering applications that may request predictions from transit characteristic model 810 in order to provide shipping estimates to customers, or order fulfillment applications that may seek to optimize for the lowest-cost shipping method 130 that may still meet a promised delivery date, as described in greater detail below. Enterprise applications 860 may also include audit applications, order status monitoring applications, or any other suitable applications. Like transit characteristic model 810, in some embodiments enterprise applications 860, as well as web services interface 830 and local API 840, may be implemented as program instructions and data stored via a computer-accessible medium as described below.

Applications of Transit Time Distribution Modeling

Once a set of regions and corresponding distribution parameters have been determined from empirical transit characteristic data, for example by transit characteristic model 810, a number of predictive applications are possible.

FIG. 10A illustrates one embodiment of a method of determining transit time given a desired surety for a given shipment. Referring collectively to FIGS. 1-10A, operation begins in block 900 where a particular region is selected. For example, in one embodiment it may be desired to ship from a particular source 110 to a destination 120 using a particular shipping method 130. Of all regions corresponding to the source 110 and shipping method 130, a region that includes the destination 120 may be selected as the particular region. In some embodiments, a destination 120 may fall into multiple qualifying regions, in which case each qualifying region 200 may be evaluated or one particular region may be selected based on other criteria.

A desired surety factor may also be specified (block 902). For example, a 98% surety that the transit time will be less than or equal to the predicted time may be specified. In some embodiments, surety factor may be specified as an argument along with arguments identifying the source 110, destination 120 and shipping method 130 in a single call to transit characteristic model 810. Additionally, the specified surety level may vary depending on the day of the week. For example, a lower surety level may be required for the end of the week since carriers can typically catch up during the weekend. However, a higher surety level may be required for the beginning of the week, e.g., because Monday or Tuesday shipments may be typically required for the work week. Such surety levels may be determined automatically (e.g., by a computer system, e.g., using a rule based system) or manually, as desired.

The transit characteristics of the selected region is then evaluated with respect to the specified surety factor to determine the corresponding transit time (block 904).

FIG. 10B illustrates one embodiment of a method of determining a surety factor given a desired transit time for a given shipment. Referring collectively to FIGS. 1-10B, operation begins in block 910 where a particular region 200 is selected, which may occur as for step 900 of FIG. 10A.

A desired transit time is also specified (block 912). For example, a two-day transit time may be desired in order to meet a shipping commitment to a customer. In some embodiments, desired transit time may be specified as an argument along with arguments identifying the source 110, destination 120 and shipping method 130 in a single call to transit characteristic model 810.

The transit data of the selected region 200 is then evaluated with respect to the specified transit time to determine the corresponding surety factor (block 914).

Transit Data Management

Figure 11:
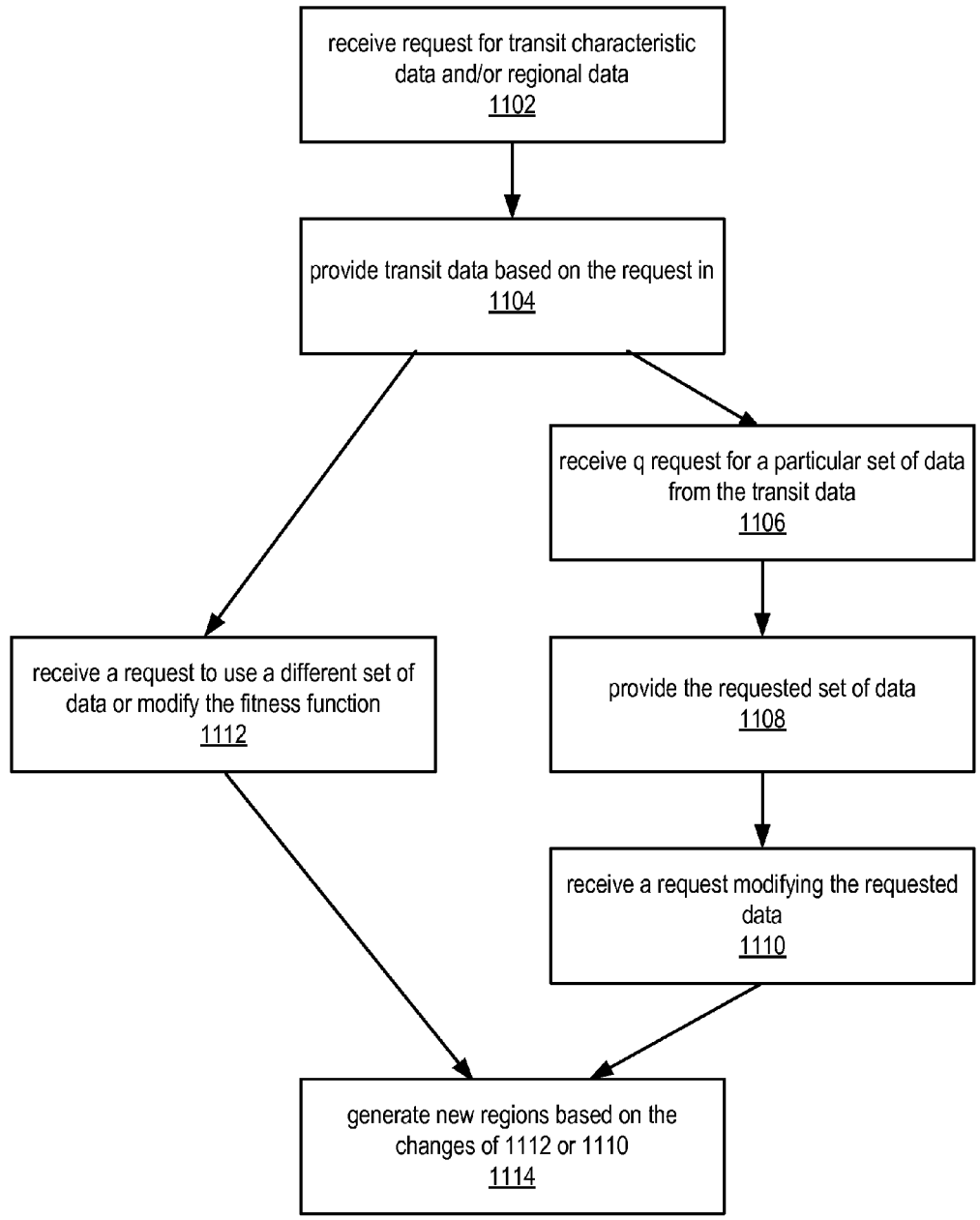
FIG. 11 is a flow diagram illustrating one embodiment of a method for managing transit data.

FIG. 11 illustrates a method for managing transit data. The method shown in FIG. 11 may be used in conjunction with any of the computer systems or devices shown in the Figures, among other devices. For example, the data management method described regarding FIG. 11 may particularly apply to the model implementation described above. In various embodiments, some of the method elements shown may be performed concurrently, in a different order than shown, or may be omitted. Additional method elements may also be performed as desired. As shown, this method may operate as follows.

In 1102, a request may be received for transit characteristic data or regional data. For example, the request may be from a user, e.g., received via a web service, such as described above. According to various embodiments, the request may be a specific request or a more general one. For example, the request may be as specific as a particular transit time for a particular destination, such as described above regarding FIG. 8. However, the request may be more broad, e.g., requesting a set of regions and associated transit data for the set of regions in an area.

In 1104, regional data and/or transit characteristic data may be provided in response to the request in 1102. For example, where the request involves a set of regions and associated transit data, the provided data may take the form of a regional map, such as those shown in FIGS. 5A-7 (e.g., FIG. 5D). However, while this form of data may be particularly well suited for displaying such transit data, the data may take on any of numerous forms, including data tables, graphs, etc.

In 1106, a particular set of data may be requested for further review. For example, a user may request to view data for a particular region, e.g., using the web service. More specifically, a user may wish to review data of regions which have an "odd" or undesirable transit characteristic, e.g., to ensure that valid data is being used and/or to identify a potential problem. In one embodiment, the user may be able to "drill down" into the map provided in 1104 to view smaller regions or more specific data.

In 1108, the requested set of data may be provided in response to the request in 1106. For example, the individual observations of the region (or regions) in question may be provided for review. Similar to above, the data may be provided in any of various forms, e.g., histograms, tables, maps, etc.

In 1110, a request may be received to modify the provided data. For example, upon reviewing one or more of the observations provided in 1108, a user may decide to remove or lower the weight of some of the observations. Note that in further embodiments, the weight of these observations may be modified or created in an automatic fashion (i.e., without user input specifically modifying or creating the weights). For example, the weights may be created or modified using heuristics, e.g., based on age of the observations. This decision may be desirable in numerous situations. For example, where a region has had inclement weather and the shipping times have dramatically changed (for the worse), the delayed shipments may need to be undervalued or removed since shipping decisions should not be made based on transient conditions. As another example, occasionally shipping trucks are stolen or crashed and the understandable delays in shipping should not negatively affect the regional transit data. In various other situations, the user may desire to modify the data which is used to generate the regions.

In 1112, instead of (or in addition to) performing steps 1106-1110, a request may be received to use different data than that used to generate the regions provided in 1104. The user may wish to use different data for any number of reasons. For example, the user may wish to view data which is based on current weather conditions (e.g., in the last week, in the last month, seasonal data, etc.). More specifically, when determining shipping methods, it may be undesirable to use data from a different season, e.g., using summer data in winter when there are icy road conditions and vice versa. Similarly, the user may not wish to base regions on data from shipping times which are different from typical shipping, e.g., data from November and December may be excluded during other months as many carriers change shipping patterns for those months. In the same vein, the user may wish to blend current data with carrier provided transit times. For example, the carrier may provide estimated transit times for end of the year shipments (e.g., around Christmas). Accordingly, the current data and the provided carrier data may be combined to generate new regions. Alternatively, the user may wish to regionalize based on more recent data. In further embodiments, the user may wish to review new data that has not been applied to the regionalization data to ensure that there are no "problem" observations. In this case, after viewing the new data in 1114, the user may go through steps 1108 and 1110 before the new data is applied to the regionalization algorithm described above.

Additionally, instead of modifying the data being used in 1112, the user may modify the fitness function to specify whatever desired criteria and weights desired. For example, the fitness function may be a pluggable interface which the user may interact with, e.g., via the data model described above regarding FIG. 8.

In 1114, in response to the change of data in 1112 or the modification of data in 1110, new regions may be generated and provided. Depending on the request, the regionalization algorithm may be completely re-performed, or may be only incrementally performed to update a particular region, e.g., as described above regarding FIGS. 3 and 4.

In further embodiments, instead of modifying data or re-performing the regionalization algorithm as described in FIG. 11, new data may be used with the existing regions. For example, where regions were defined using a first set of data, when a new set of data is received, the transit characteristics of the old regions with the new data may be compared to the transit characteristics of the old data. Accordingly, improvements or deficiencies may be identified for the new data. In some embodiments, such analysis may be used to identify problems, e.g., where a shipping company is having problems in certain areas, etc.

Note that while the management embodiments described above are described above in terms of user input and manual changes, various ones of the steps may be replaced by automatic input provided by a computer system or program.

Further Embodiments

In one embodiment, the methods of described above may form the basis of basic transit time predictions implemented by transit characteristic model 810. However, these methods, or variants thereof, may also be used to form more sophisticated inquiries based on transit characteristics. For example, in one embodiment, transit characteristic model 810 may be configured to determine what shipping method 130, if any, satisfies both a given transit time and a given surety factor for shipment from a source 110. In one such embodiment, transit characteristic model 810 may be configured to iterate over all regions corresponding to the source 110 and containing the destination 120, applying the method of FIG. 10A to each region along with the given surety factor and determining whether the resulting transit time is less than or equal to the given transit time. Alternatively, the method of FIG. 10B may be applied to each region 200 along with the given transit time, and transit characteristic model 810 may be configured to determine whether the resulting surety factor is greater than or equal to the given or desired surety factor.

Other types of predictions based on transit time and surety factor are possible and contemplated. For example, as indicated above, in various embodiments transit characteristic model 810 may be configured to determine the lowest cost shipping method 130 that satisfies a given transit time and surety factor, or to minimize transit time for a given surety factor (or similarly, maximize surety factor for a given transit time) over a set of shipping methods 130 (e.g., shipping methods 130 representing a fixed or maximum cost, preferred shipping vendors, etc.).

More generally, in some embodiments predictions based on empirically-based transit time and surety factor may enable an enterprise to manage transit decisions based on actual shipping behavior as well as risk tolerance. For example, a surety factor of 85% may be substantially less expensive to achieve than a surety factor of 98% for a given transit latency, while still reflecting a considerable likelihood that the given transit latency will be achieved. An enterprise may weigh the cost savings of shipping methods 130 exhibiting lower surety factor to a given region 200 against the possible costs if the given transit latency is not achieved (e.g., refunds owed to customers under shipping performance guarantees, opportunity costs, etc.). For example, surety factor may be used as the basis for an expected value analysis of a shipping scenario of the form:

$$E = S \cdot \text{surety} - C \cdot (1 - \text{surety})$$

where S and C respectively denote the savings and costs if the transit time is achieved or not achieved, and surety is expressed as a fractional value.

In some embodiments, such an expected value analysis based on surety factor may be employed as the basis for determining whether to offer a customer a performance guarantee (e.g., insurance or compensation payable to the customer in the event the promised level of transit performance is not achieved), and/or the potential cost of such a guarantee (e.g., that may be charged to the customer, absorbed by the enterprise, or charged to a third party insurer or reinsurer). For example, high surety may imply low risk of failure to perform, and thus minimal risk in guaranteeing performance by, e.g., offering a full or partial refund of shipping costs to a customer in case of such a failure. Correspondingly, the cost to guarantee performance may be relatively low. Conversely, low surety may imply high risk of failure to perform, and a correspondingly higher cost to insure performance.

However, the various cost analyses described above may not be necessary when incorporated into the fitness function, e.g., to minimize costs, as described in various embodiments above, e.g., regarding FIGS. 3 and 4.

Similarly, in some embodiments shipping methods 130 may be selected on the basis of transit time and surety factor for a specific destination 120 rather than on the method itself Conventionally, a customer typically specifies a desired shipping method 130 to be used to fulfill an order. However, in one embodiment a customer may specify a desired transit time and/or surety factor, and transit characteristic model 810 may be configured to determine whether a given shipping method 130 satisfies the given constraints. For example, in one instance a customer may desire a single-day transit time with a reasonably high (e.g., 85%) surety factor. Rather than default to an expedited shipping method 130 such as overnight shipping, transit characteristic model 810 may identify that a less expensive shipping method 130 such as ground shipping yields the desired transit time and surety factor for the customer's destination 120. In various embodiments, the cost savings realized by identifying a satisfactory, less expensive shipping method 130 in this manner may be retained as profit margin, offered to the customer as a cost reduction, or a combination of these.

Further, various sets of observations (e.g., for different source locations and/or different shipping methods) may be combined together to identify various improvements which may be implemented. For example, if all sources data is combined, the resulting transit characteristic data (e.g., shown on a map) may be used to determine where a shipping center or distribution facility should be added. For example, if there is a region or set of regions on the map that has 3 day shipping, it may be desirable to add a new distribution center at or near that location. As another example, all shipping methods may be used for a single source location to determine if there are shipping method issues from a location to various destinations, regardless of the shipping method.

In some embodiments, transit characteristic modeling as described above may also be used in conjunction with a method or system for speculative or anticipatory package shipping, as described in greater detail in U.S. patent application Ser. No. 11/015,288, entitled "Method and system for anticipatory package shipping" and filed on Dec. 17, 2004, and in U.S. patent application Ser. No. 11/015,290, entitled "Method and system for forecasted package shipping using late-select addressing" and filed on Dec. 17, 2004, each of which is hereby incorporated by reference in its entirety. Generally speaking, speculative or anticipatory shipping of a package includes shipping the package to a destination geographical area without completely specifying a delivery address for the package at the time of shipment, and completely specifying the delivery address while the package is in transit. Such shipping may be understood to be "anticipatory" in that it may be performed in anticipation of a customer actually placing an order or request for the contents of the package (e.g., prior to the order actually occurring). For example, a package may be shipped to a particular geographical area (e.g., a metropolitan area) when there is a reasonable expectation that by the time the package arrives in the particular geographical area, a customer will have placed an order or request for the package contents, and the package may then be routed to the delivery address of the customer.

Transit characteristic modeling may be particularly useful in conjunction with anticipatory package shipping. In some embodiments, the geographical regions of the transit characteristic model may correspond to geographical areas to which a package may be anticipatorily shipped. Correspondingly, in one embodiment transit characteristic model 810 may be used to predict the transit latency to a destination region for an anticipatorily shipped package using a given shipping method 130 and a given surety factor, as described above. The predicted transit time may then be used as a guide or metric for the window of time in which the package may be in transit before a corresponding customer order needs to occur, or the package needs to be returned, stored or redirected to another geographical region. In another embodiment, the desired transit time and surety factor (e.g., 5 days at 98% surety) may be specified, and transit characteristic model 810 may be configured to identify destination regions and/or shipping methods 130 that qualify. More generally, in some embodiments transit characteristic model 810 may be configured to optimize for (e.g., to maximize, minimize, or solve for an optimal value) any one or more of transit time, surety factor, shipping method 130 or cost thereof, or destination region, given specified values for the remaining parameters. In some embodiments, transit characteristic model 810 may also model other variables that may be incorporated into the prediction and optimization processes, in addition to those variables that may be derived from empirical transit characteristic data. For example, in some embodiments transit characteristic model 810 may be integrated with other models that may predict customer demand, future item pricing behavior, or other variables.

Transit characteristic modeling and prediction such as described above may also be useful in conjunction with other shipping and inventory management techniques. For example, an enterprise may employ forward-deployed inventory as an alternative to using a small number of centralized inventory facilities. Generally speaking, forward-deployed inventory includes the placement of inventory items at locations or nodes that are relatively close to potential customers, for example by implementing relatively small, localized inventory facilities or by contracting with common carriers to keep a supply of ready-to-ship inventory items at or near shipping hubs. In one embodiment, each inventory node within a forward-deployed inventory system may be treated as a source location 110 for the purposes of transit characteristic modeling, which may considerably simplify transit data management over point-to-point modeling approaches especially if a large number of nodes are used.

It is noted that in various embodiments, transit characteristics may be modeled to an arbitrary level of granularity or precision. For example, transit latency may be modeled not only in days, but in hours or fractions of hours. Modeling transit latency with relatively fine granularity may enable the prediction of transit latencies within very narrow windows. For example, in one embodiment, transit characteristic model 810 may be configured to predict transit latency and associated surety for time windows as short as several hours, or even several minutes. Such fine-grained predictions may enable an enterprise to offer a variety of narrowly-targeted transit options to customers. For example, fine-grained predictions may allow a customer to specify same-day delivery, a given window of time for delivery on a given day, or a given window of time for delivery relative to the current time (e.g., delivery within the next N hours from the current time). Modeling of surety factors in conjunction with fine-grained transit latency prediction may also enable a customer to specify closed-ended rather than open-ended delivery windows. That is, a customer may specify that if delivery cannot occur within an indicated window, the delivery should be cancelled (as opposed to being delivered later). The use of surety factors may enable a shipper to manage the risk associated with failing to fulfill closed-ended delivery windows in a manner similar to the performance guarantees described above.

Exemplary Computer System Embodiment

It is contemplated that in some embodiments, any of the methods or techniques described above may be implemented as program instructions and data capable of being stored or conveyed via a computer-accessible medium. Such methods or techniques may include, for example and without limitation, the functions of transit characteristic model 810, database 820, web services interface 830, local API 840, or enterprise applications 860, as well as the methods illustrated in the flowcharts described above. Such program instructions may be executed to perform a particular computational function, such as analysis of transit time data to determine region dimensions and probability distributions, implementations of specific prediction algorithms, database management and querying, remote procedure calls and web services requests, operating system functionality, applications, and/or any other suitable functions.

Figure 12:
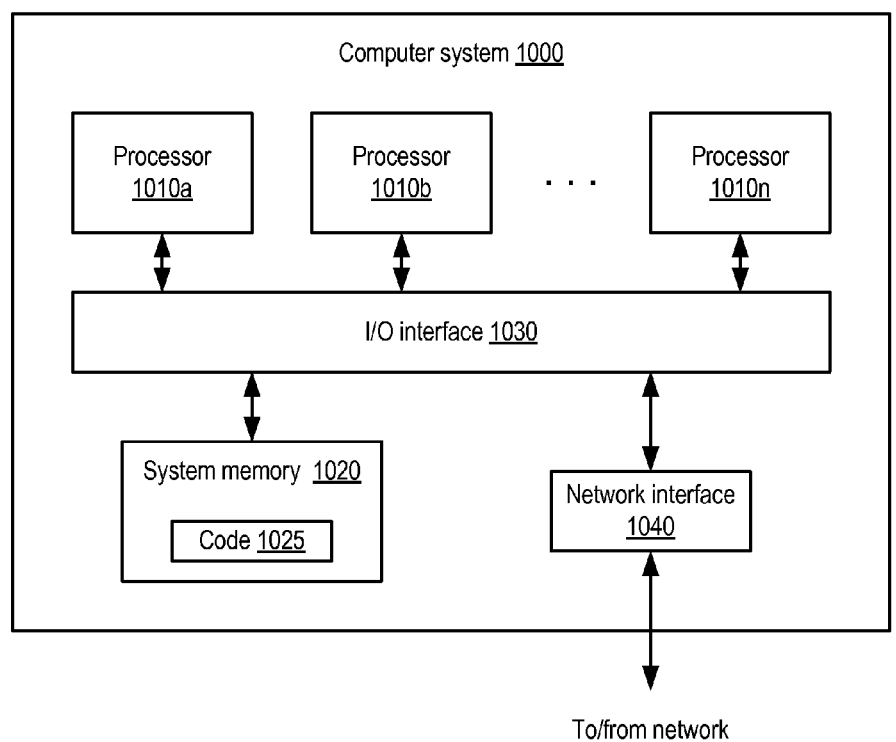
FIG. 12 is a block diagram illustrating an exemplary embodiment of a computer system.

One exemplary embodiment of a computer system including computer-accessible media is illustrated in FIG. 12. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. In some embodiments, it is contemplated that inventory management system 50 may be implemented using by a single instance of computer system 1000, while in other embodiments multiple such systems may be configured to host different portions of inventory management system 50. For example, in one embodiment some data sources or services may be implemented via instances of computer system 1000 that are distinct from those instances implementing other data sources or services.

In various embodiments computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be a general-purpose or embedded processor implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by process 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 1020 as code 1025.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, for example. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or CD/DVD coupled to computer system 1000 via I/O interface 1030. A computer-accessible medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. A computer-accessible medium may be accessible via various transmission media or signals such as electrical, electromagnetic, or digital signals, conveyed via a communication medium such as a network and/or a wireless link, such as may be implemented via network interface 1040.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
    performing by one or more computers:
        determining respective values of transit characteristics from a source location to a plurality of destination locations, wherein the plurality of destination locations define a macro region;
        dividing the macro region into a first plurality of regions;
        performing splitting of one or more regions of the first plurality of regions to create additional regions and expanding at least one of the first plurality of regions to form a new region, wherein said splitting and expanding is performed a plurality of times to generate a plurality of possible sets of regions, wherein each set of the plurality of possible sets comprises a different plurality of divisions of regions of the macro region;
        evaluating each set of possible regions using a fitness function, wherein said evaluating comprises applying the fitness function to each region of the set of possible regions to produce a fitness score, wherein the fitness function takes the respective values of transit characteristics for each region as input;
        selecting a set of regions for the macro area based on said evaluating, wherein the selected set of regions has a best fitness score based on the evaluation of the sets of possible regions; and
        determining a regional value of a transit characteristic for at least one region of the selected set of regions, wherein the regional value provides a common transit characteristic value for each of multiple destinations within the respective region.

2. The method of claim 1, wherein said splitting and said expanding is performed in a recursive manner for each of the first plurality of regions, the corresponding additional regions, and the corresponding new regions, and wherein said evaluating is performed for each set of possible regions for the region.

3. The method of claim 1, further comprising:
    dynamically performing said determining, said performing splitting and expanding, said evaluating, and said selecting dependent upon collecting empirical transit data.

4. The method of claim 1, wherein said expanding is performed upon determining that the new region has a better fitness score than at least one of the plurality of regions.

5. The method of claim 1, wherein said splitting is performed upon determining that each of the additional regions includes a minimum threshold of values of transit characteristics.

6. The method of claim 1, wherein the one or more transit characteristics comprise transit time from the source location to the plurality of destination locations, and wherein the respective values of transit characteristics comprise transit times from the source location to the plurality of destination locations.

7. The method of claim 1, wherein the one or more transit characteristics comprise transit variability from the source location to the plurality of destination locations, and wherein the respective values of transit characteristics comprise transit variabilities from the source location to the plurality of destination locations.

8. The method of claim 1, wherein said determining, said dividing, said performing, and said evaluating are performed a plurality of times for respective different shipping methods from the source location.

9. The method of claim 1, further comprising:
    providing the selected set of regions and regional values of the transit characteristic of the selected set of regions for display.

10. The method of claim 9, further comprising:
    receiving input selecting a region from the selected set of regions;
    providing the respective values of transit characteristics for the selected region;
    receiving input modifying a first value of the respective values of transit characteristics for the selected region; and
    modifying the first value based on the received input.

11. The method of claim 1, wherein the plurality of regions comprise polygons greater than 4 sides.

12. The method of claim 11, wherein the polygons are based on postal codes.

13. The method of claim 1, wherein weights are associated with transit characteristics, wherein said evaluating each set of possible regions using the fitness function utilizes the weights associated with the transit characteristics.

14. A non-transitory computer-accessible memory medium comprising program instructions, wherein the program instructions are executable to:

determine respective values of transit characteristics from a source location to a plurality of destination locations, wherein the plurality of destination locations define a macro region;

divide the macro region into a first plurality of regions;

perform splitting of one or more regions of the first plurality of regions to create additional regions and expanding at least one of the first plurality of regions to form a new region, wherein said splitting and expanding is performed a plurality of times to generate a plurality of possible sets of regions, wherein each set of the plurality of possible sets comprises a different plurality of divisions of regions of the macro region;

evaluate each set of possible regions using a fitness function, wherein said evaluating comprises applying the fitness function to each region of the set of possible regions to produce a fitness score, wherein the fitness function takes the respective values of transit characteristics for each region as input;

select a set of regions for the macro area based on said evaluating, wherein the selected set of regions has a best fitness score based on the evaluation of the sets of possible regions; and determine a regional value of a transit characteristic for at least one region of the selected set of regions, wherein the regional value provides a common transit characteristic value for each of multiple destinations within the respective region.

15. The non-transitory memory medium of claim 14, wherein said splitting and said expanding is performed in a recursive manner for each of the first plurality of regions, the corresponding additional regions, and the corresponding new regions, and wherein said evaluating is performed for each set of possible regions for the region.

16. The non-transitory memory medium of claim 14, wherein the program instructions are further executable to:
dynamically perform said determining, said performing splitting and expanding, said evaluating, and said selecting dependent upon collecting empirical transit data.

17. The non-transitory memory medium of claim 14, wherein said expanding is performed upon determining that the new region has a better fitness score than at least one of the plurality of regions.

18. The non-transitory memory medium of claim 14, wherein said splitting is performed upon determining that each of the additional regions includes a minimum threshold of values of transit characteristics.

19. The non-transitory memory medium of claim 14, wherein the one or more transit characteristics comprise transit time from the source location to the plurality of destination locations, and wherein the respective values of transit characteristics comprise transit times from the source location to the plurality of destination locations.

20. The non-transitory memory medium of claim 14, wherein the one or more transit characteristics comprise transit variability from the source location to the plurality of destination locations, and wherein the respective values of transit characteristics comprise transit variabilities from the source location to the plurality of destination locations.

21. The non-transitory memory medium of claim 14, wherein said determining, said dividing, said performing, and said evaluating are performed a plurality of times for respective different shipping methods from the source location.

22. The non-transitory memory medium of claim 14, wherein the program instructions are further executable to:

provide the selected set of regions and regional values of the transit characteristic of the selected set of regions for display.

23. The non-transitory memory medium of claim 22, wherein the program instructions are further executable to:
receive input selecting a region from the selected set of regions;
provide the respective values of transit characteristics for the selected region;
receive input modifying a first value of the respective values of transit characteristics for the selected region; and
modify the first value based on the received input.

24. The non-transitory memory medium of claim 14, wherein the plurality of regions comprise polygons greater than 4 sides.

25. The non-transitory memory medium of claim 14, wherein weights are associated with transit characteristics, wherein said evaluating each set of possible regions using the fitness function utilizes the weights associated with the transit characteristics.

26. A system, comprising:
one or more processors; and
one or more memory mediums coupled to the one or more processors, wherein the one or more memory mediums comprise program instructions, wherein the program instructions are executable by the one or more processors to:
determine respective values of transit characteristics from a source location to a plurality of destination locations, wherein the plurality of destination locations define a macro region;
divide the macro region into a first plurality of regions;
perform splitting of one or more regions of the first plurality of regions to create additional regions and expanding at least one of the first plurality of regions to form a new region, wherein said splitting and expanding is performed a plurality of times to generate a plurality of possible sets of regions, wherein each set of the plurality of possible sets comprises a different plurality of divisions of regions of the macro region;
evaluate each set of possible regions using a fitness function, wherein said evaluating comprises applying the fitness function to each region of the set of possible regions to produce a fitness score, wherein the fitness function takes the respective values of transit characteristics for each region as input;
select a set of regions for the macro area based on said evaluating, wherein the selected set of regions has a best fitness score based on the evaluation of the sets of possible regions; and
determine a regional value of a transit characteristic for at least one region of the selected set of regions, wherein the regional value provides a common transit characteristic value for each of multiple destinations within the respective region.

27. The system of claim 26, wherein said splitting and said expanding is performed in a recursive manner for each of the first plurality of regions, the corresponding additional regions, and the corresponding new regions, and wherein said evaluating is performed for each set of possible regions for the region.

28. The system of claim 26, wherein the program instructions are further executable to:
dynamically perform said determining, said performing splitting and expanding, said evaluating, and said selecting dependent upon collecting empirical transit data.

29. The system of claim 26, wherein said expanding is performed upon determining that the new region has a better fitness score than at least one of the plurality of regions.

30. The system of claim 26, wherein said splitting is performed upon determining that each of the additional regions includes a minimum threshold of values of transit characteristics.

31. The system of claim 26, wherein the one or more transit characteristics comprise transit time from the source location to the plurality of destination locations, and wherein the respective values of transit characteristics comprise transit times from the source location to the plurality of destination locations.

32. The system of claim 26, wherein the one or more transit characteristics comprise transit variability from the source location to the plurality of destination locations, and wherein the respective values of transit characteristics comprise transit variabilities from the source location to the plurality of destination locations.

33. The system of claim 26, wherein said determining, said dividing, said performing, and said evaluating are performed a plurality of times for respective different shipping methods from the source location.

34. The system of claim 26, wherein the program instructions are further executable to:
provide the selected set of regions and regional values of the transit characteristic of the selected set of regions for display.

35. The system of claim 34, wherein the program instructions are further executable to:
receive input selecting a region from the selected set of regions;
provide the respective values of transit characteristics for the selected region;
receive input modifying a first value of the respective values of transit characteristics for the selected region; and
modify the first value based on the received input.

36. The system of claim 26, wherein the plurality of regions comprise polygons greater than 4 sides.

37. The system of claim 26, wherein weights are associated with transit characteristics, wherein said evaluating each set of possible regions using the fitness function utilizes the weights associated with the transit characteristics.

* * * * *